(12) United States Patent
Feng et al.

(10) Patent No.: US 11,645,788 B2
(45) Date of Patent: May 9, 2023

(54) SKY REPLACEMENT PRESET LOADING

(71) Applicant: ADOBE INC., San Jose, CA (US)

(72) Inventors: Guotong Feng, San Jose, CA (US); Alan Erickson, Franktown, CO (US); I-Ming Pao, Palo Alto, CA (US); Betty Leong, Los Altos, CA (US); Hyunghwan Byun, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/233,639

(22) Filed: Apr. 19, 2021

(65) Prior Publication Data

US 2022/0335659 A1 Oct. 20, 2022
US 2023/0037276 A9 Feb. 2, 2023

Related U.S. Application Data

(60) Provisional application No. 63/093,237, filed on Oct. 18, 2020.

(51) Int. Cl.
G06T 11/00 (2006.01)
G06T 7/11 (2017.01)

(52) U.S. Cl.
CPC .......... G06T 11/00 (2013.01); G06T 7/11 (2017.01); G06T 2200/24 (2013.01); G06T 2207/10024 (2013.01); G06T 2207/20084 (2013.01); G06T 2210/36 (2013.01)

(58) Field of Classification Search
None
See application file for complete search history.

(56) References Cited

U.S. PATENT DOCUMENTS

| 6,266,068 | B1 | 7/2001 | Kang et al. |
| 9,053,578 | B2 | 6/2015 | Beckman |
| 9,857,953 | B2 | 1/2018 | Sunkavalli et al. |
| 9,858,675 | B2 | 1/2018 | Shen et al. |
| 10,074,161 | B2 | 9/2018 | Shen et al. |

(Continued)

OTHER PUBLICATIONS

Office Action dated Oct. 6, 2022 in corresponding U.S. Appl. No. 17/204,638.

(Continued)

Primary Examiner — Yanna Wu
(74) Attorney, Agent, or Firm — F. Chau & Associates, LLC

(57) ABSTRACT

Systems and methods for image editing are described. Embodiments of the present disclosure provide an image editing system for performing image object replacement or image region replacement (e.g., an image editing system for replacing an object or region of an image with an object or region from another image). For example, the image editing system may replace a sky portion of an image with a more desirable sky portion from a different replacement image. According to some embodiments described herein, thumbnails, region location information, and image metadata from multiple preset images can be stored together and loaded for presentation and selection of a preset image for replacing a region of an image. Once a preset image (e.g., an image with a replacement sky) is selected, a high-resolution version of the image can be loaded and used to generate a composite image.

19 Claims, 16 Drawing Sheets

(56) References Cited

U.S. PATENT DOCUMENTS

| | | |
|---|---|---|
| 10,163,195 B2 | 12/2018 | Berlin et al. |
| 10,867,416 B2 | 12/2020 | Shen et al. |
| 2010/0246976 A1 | 9/2010 | Tolstaya |
| 2016/0070460 A1* | 3/2016 | Gradert .................... H04N 1/00 715/771 |
| 2017/0236287 A1 | 8/2017 | Shen et al. |
| 2017/0294000 A1* | 10/2017 | Shen ..................... G06T 11/001 |
| 2020/0134834 A1 | 4/2020 | Pao et al. |

OTHER PUBLICATIONS

PhotoshopCafe, "how to fix edges in photoshoot cut outs", available online at [https://www.youtube.com/watch?v=JKfRXKwbbXI], published on Dec. 11, 2018 (Year: 2018).

Adobe, "Replace the sky in your photos" available at [https://helpx.adobe.com/photoshop/using/replace-sky.html], published on Oct. 2020. (Year: 2020).

Final Office Action dated Jan. 18, 2023 in corresponding U.S. Appl. No. 17/204,638.

Paul Trani, "How to Use the Sky Replacement Feature in Photoshop" avialable online at [https://www.youtube.com/watch?v=RYq7XOIKWWM], published on Nov. 18, 2020, 6 pages. (Year: 2020).

\* cited by examiner

SKY REPLACEMENT PRESET LOADING

BACKGROUND

The following relates generally to image editing, and more specifically to replacing regions or objects of an image with portions of another image.

Image editing is a process used to alter properties of an image, for example, to increase the quality of an image or video. In some cases, an image is altered to have a desired appearance or to improve the visibility or clarity of the image. Replacing portions of an image and inserting portions of one image into another are common image editing tasks.

For example, in some cases users may wish to replace the sky in one image with the sky from another image. Sky replacement and other region replacement tasks can be performed by image editing software applications. However, transferring portions of one image into another image can be difficult and time-consuming. For example, using current techniques, the photographer first manually identifies a sky region and a foreground region with labels or brushes. Once identified, the sky and foreground regions can be segmented from each other.

In some existing cases, the identification and segmentation of the different regions may include manually assigning individual pixels a sky or non-sky label. This manual segmenting process is done for both the image having the desired foreground region and the image having the desired sky region. Segmentation problems may arise due to a number of factors including large variations in appearance, and complicated boundaries with other regions or objects such as trees. That is, small portions of a sky may be located between leaves of a tree, which can make segmentation challenging or inaccurate.

Thus, users who wish to replace regions of an image are often faced with a tedious and time-consuming task. Furthermore, the computing task of loading high resolution images and replacing portions of an image a corresponding region from another region can be computationally intensive. Therefore, there is a need in the art for an improved image editing application that can efficiently load preset images and combine a portion of preset image with an original image in a natural looking way.

SUMMARY

The present disclosure provides systems and methods for image editing. Embodiments of the present disclosure provide an image editing system for performing image object replacement or image region replacement (e.g., an image editing system for replacing and object or region of an image with an object or region from another image). For example, the image editing system may replace a sky portion of an image with a more desirable sky portion from a different replacement image. According to some embodiments described herein, thumbnails, region location information, and image metadata from multiple preset images can be stored together and loaded for presentation and selection of a preset image for replacing a region of an image. Once a preset image (e.g., an image with a replacement sky) is selected, a high-resolution version of the image can be loaded and used to generate a composite image.

According to embodiments described herein, sky masks may be saved as presets for quick and easy implementation of producing aesthetically pleasing composite images from original image data using the preset sky masks. In some embodiments, preset information (e.g., information for a set of preset images) and original image data may be used to generate low-resolution previews of a target region (e.g., a sky region) in the original image data replaced with various available preset images. A user may select a preset image (e.g., from among the set of available preset images) based on the low-resolution previews. Based on the selected preset image (e.g., or the selected low-resolution preview of the composite image), the image editing system may load high-resolution image data for the selected preset image and a target region of the original image data may be replaced with a corresponding source region of the selected preset image, resulting in a high-resolution natural looking composite image.

A method, apparatus, non-transitory computer readable medium, and system for image editing are described. Embodiments of the method, apparatus, non-transitory computer readable medium, and system are configured to receive original image data, retrieve preset information for a plurality of preset images, wherein the preset information for each of the preset images includes low-resolution image data and region location information for the corresponding preset image, generate at least one low-resolution preview based on the original image data and the preset information, select a preset image from among the plurality of preset images based on the at least one low-resolution preview image, and load high-resolution image data for the selected preset image.

A method, apparatus, non-transitory computer readable medium, and system for image editing are described. Embodiments of the method, apparatus, non-transitory computer readable medium, and system are configured to perform a segmentation information on each of a plurality of preset images to produce region location information, generate low-resolution image data for each of the preset images, store preset information including the region location information and the low-resolution image data for each of the plurality of preset images in a same preset information file, and store high-resolution image data for each of the preset images in separate image files.

An apparatus, system, and method for image editing are described. Embodiments of the apparatus, system, and method include a segmentation network configured to generate region location information for a plurality of preset images, a thumbnail component configured to generate low-resolution image data for the preset images, a database configured to store a preset information file including the region location information and the low-resolution image data in a preset information file and to store high-resolution image data for the preset images in separate image files, and a preview component configured to generate at least one low-resolution preview based on the preset information.

DETAILED DESCRIPTION

Figure 1:
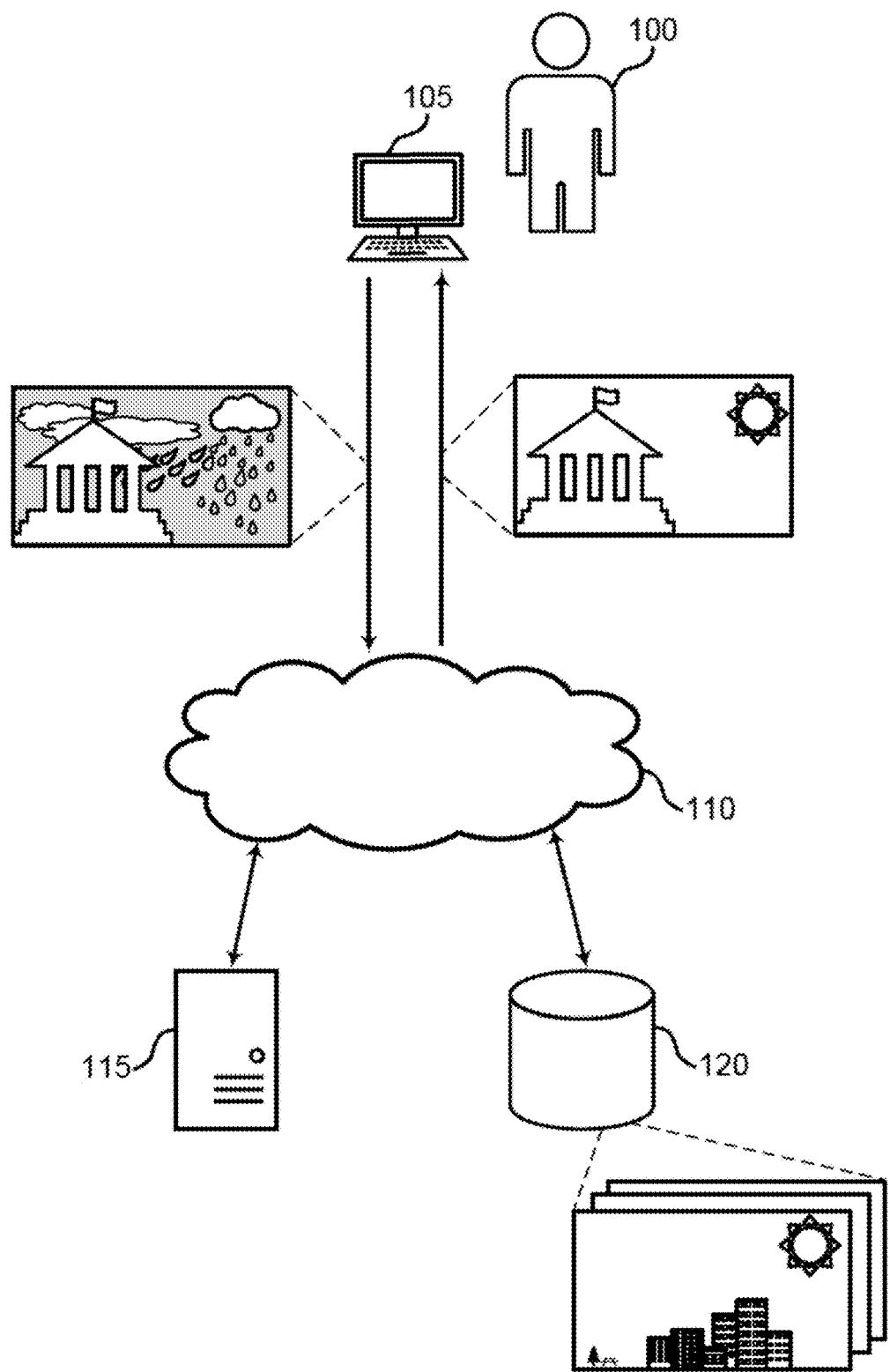
FIG. 1 shows an example of an image editing system according to aspects of the present disclosure.

The present disclosure describes systems and methods for image editing. Embodiments of the present disclosure provide an image editing system for performing image object replacement or image region replacement (e.g., an image editing system for replacing and object or region of an image with an object or region from another image). For example, the image editing system may replace a sky portion of an image with a more desirable sky portion from a different replacement image. According to some embodiments described herein, thumbnails, region location information, and image metadata from multiple preset images can be stored together and loaded for presentation and selection of a preset image for replacing a region of an image. Once a preset image (e.g., an image with a replacement sky) is selected, a high-resolution version of the image can be loaded and used to generate a composite image.

In an example scenario, a photographer may perform a photoshoot on an overcast or rainy day. However, the overcast sky may not be desirable for an aesthetically pleasing image. Therefore, the photographer may prefer another sky from another picture taken during a sunny day. However, the process of replacing a sky portion of the image involves segmenting the foreground of the image from the sky, replacing the sky with a sky from another image, and performing color matching to make the composite image natural looking. This process can be difficult and time-consuming.

Using current techniques, a photographer first manually identifies the sky region and foreground region with labels or brushes in a design application. Once identified, the sky and foreground regions can be segmented from each other. In some cases, the identification and segmentation of the different regions may include manually assigning individual pixels a sky or non-sky label. These and other segmentation problems arise due to a number of factors including large variations in image appearance and complicated boundaries with other regions or objects such as trees, mountains, water, and the like. Such techniques can be tedious and time-consuming, and in some cases result in unwanted visual artefacts and unnatural effects in generated composite images.

Embodiments of the present disclosure provide fast preset loading and saving. For instance, sky masks may be saved as presets for quick and easy implementation of producing aesthetically pleasing composite images from original image data using the preset sky masks. In some embodiments, preset information (e.g., information for a set of preset images) and original image data may be used to generate low-resolution previews of a target region (e.g., a sky region) in the original image data replaced with various available preset images. A user may select a preset image (e.g., from among the set of available preset images) based on the low-resolution previews. Based on the selected preset image (e.g., or the selected low-resolution preview of the composite image), the image editing system may load high-resolution image data for the selected preset image and a region of the original image data may be replaced with a corresponding region of the selected preset image, resulting in a high-resolution natural looking composite image.

In some embodiments, a defringing layer is generated by combining a region mask of the original image with a grayscale version of the replacement image. The defringing layer is combined with the original image and a region specific layer (e.g., a layer that reveals a replacement background from another image) to produce a composite image. Accordingly, the produced composite image may include the foreground of the original image and the background of the replacement image, but the lighting of the composite image near the region boundary is more realistic.

Embodiments of the present disclosure provide a fully automatic, non-destructive image replacement method using the original image and a replacement image as input. A layer structure enables the non-destructive effect. That is, the replacement effect is provided by adding layers on top of an original image rather than editing the image itself. Embodiments of the present disclosure use an advanced pipeline for mask editing in a preview mode.

Additionally, real-time color harmonization based on the visible sky region of the replacement image may be used to produce more natural colorization. In some examples, horizon-aware sky alignment and placement with advanced padding may also be used. For example, the horizons of the original image and the replacement image may be automatically detected and aligned. Additionally, some embodiments of the present disclosure provide fast preset loading and saving.

Embodiments of the present disclosure may be used in the context of a tool for replacing a sky region of one image with a sky region of another image. A sky replacement example is provided with reference to FIGS. 1 through 5. Details regarding generating a region replacement layer (e.g., a sky layer) are provided with reference to FIGS. 3 and 4. Examples of a defringing layer are provided with reference to FIGS. 8 through 10. Details regarding color harmonization layer are provided with reference to FIGS. 11 and 12. Details regarding preset loading are provided with reference to FIGS. 13 through 16.

Sky Replacement

FIG. 1 shows an example of an image editing system according to aspects of the present disclosure. The example shown includes user 100, device 105, cloud 110, image editing apparatus 115, and database 120. Image editing apparatus 115 is an example of, or includes aspects of, the corresponding element described with reference to FIG. 3.

The image editing system uses compositing methods based on combining images and segmentation masks to replace a sky portion of an image while suppressing artefacts such as a halo/fringing effect, to automatically create high-quality sky replacement results.

Some compositing techniques such as alpha matting result in unwanted visual artefacts. Even if the segmentation is perfect, differences between the images being composited (e.g., color/brightness differences between the foreground from one image and the sky from another) may lead to objectionable fringing artefacts. This can be mitigated by blurring out the segmentation, but such blurring may lead to halo artefacts.

Therefore, in the example of FIG. 1, the user 100 interacts with an image editing apparatus 115 via a device 105. In some examples, the image editing apparatus 115 is located on the cloud 110. However, in some examples the image editing apparatus 115 is located on the device 105 itself. The user 100 provide an original image such as a picture or photograph. In the example shown, the original image includes a building in rainy weather. The user 100 then finds an image with a more appealing background (i.e., from among images stored on the device 105 or within the database 120).

The image editing apparatus 115 segments the original image to identify a foreground and a background. Then, the image editing apparatus 115 creates a composite image using the foreground of the original image and a sky region from the selected replacement image. Multiple segmentation masks may be combined with the sky replacement image to create a sky replacement layer, and one of these segmentation masks (or a separate mask) may also be combined with a greyscale version of the replacement sky to create a defringing layer (e.g., which in some case may be referred to as a lighting layer) that reduces the halo effect. In some embodiments, the image editing apparatus 115 automatically harmonize the colors of the foreground and the new background (i.e., the replacement sky).

Embodiments of the present disclosure utilize compositing methods that generate high-quality composites without fringing and halo artefacts. In some examples, the methods described herein generate multiple masks—e.g., a hard mask and a soft mask—and use carefully selected blending modes to combine the masks. This method may be performed automatically and works well across many sky replacement examples. In some cases, the input to the system includes a single image and a preset reference image is applied for the replacement sky. In other embodiments, a user 100 selects two images and a composite is made from the two images. In some cases, the system automatically selects portions of the images for composition (i.e., it can identify and replace a sky region automatically). According to embodiments of the present disclosure, a layer structure is used that enables non-destructive effects.

The device 105 may be a personal computer, laptop computer, mainframe computer, palmtop computer, personal assistant, mobile device, or any other suitable processing apparatus. The device 105 may include image editing software. The image editing software can include a variety of editing tools including the sky replacement system described in FIG. 1.

In some examples, a device 105 may also include an optical instrument (e.g., an image sensor, camera, etc.) for recording or capturing images, which may be stored locally, transmitted to another location, etc. For example, an image sensor may capture visual information using one or more photosensitive elements that may be tuned for sensitivity to a visible spectrum of electromagnetic radiation. The resolution of such visual information may be measured in pixels, where each pixel may relate an independent piece of captured information. In some cases, each pixel may thus correspond to one component of, for example, a two-dimensional (2D) Fourier transform of an image. Computation methods may use pixel information to reconstruct images captured by the device.

A cloud 110 is a computer network configured to provide on-demand availability of computer system resources, such as data storage and computing power. In some examples, the cloud 110 provides resources without active management by the user 100. The term cloud is sometimes used to describe data centers available to many users 100 over the Internet. Some large cloud networks have functions distributed over multiple locations from central servers. A server is designated an edge server if it has a direct or close connection to a user 100. In some cases, a cloud 110 is limited to a single organization. In other examples, the cloud is available to many organizations. In one example, a cloud 110 includes a multi-layer communications network comprising multiple edge routers and core routers. In another example, a cloud 110 is based on a local collection of switches in a single physical location.

According to some embodiments, database 120 stores preset information including the region location information and the low-resolution image data for each of the set of preset images in a same preset information file (i.e., a presets info file). In some examples, database 120 stores high-resolution image data for each of the preset images in separate image files. In some examples, the separate image files include JPEG or PNG files. According to some embodiments, database 120 may be configured to store the region location information and the low-resolution image data in a preset information file and to store high-resolution image data for the preset images in separate image files.

The image editing apparatus 115 includes a computer implemented network that generates a composite image. In some embodiments, the image editing apparatus 115 includes a mask generation network, a defringing component, a region-specific layer component, a layer composition component, a color harmonization component, an image property component, an image editing application, and a preset component. The preset component will be described with reference to FIG. 4. The image editing apparatus 115 takes an original image and a replacement image to produce a composite image.

The image editing apparatus 115 may also include a processor unit, a memory unit, and a user interface. Additionally, image editing apparatus 115 can communicate with the database 120 via the cloud 110. Further detail regarding the architecture of the image editing apparatus 115 is provided with reference to FIGS. 3 and 4.

In some cases, the image editing apparatus 115 is implemented on a server. A server provides one or more functions to users 100 linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user 100 interacts with database controller. In other cases, database controller may operate automatically without user 100 interaction.

In some instances, the present disclosure uses the terms original image, foreground image, and target image interchangeably. For example, an original image may be the target for replacement with the sky from a replacement image (i.e., the source of the sky). In the example of FIG. 1, the original image, sent by the user 100 to the image editing apparatus 115, may include a foreground region (e.g., the building) and a target replacement region (e.g., the overcast sky, which the user 100 intends to replace via the image editing apparatus 115).

The terms replacement image, background image, preset image, source image, reference image, sky image, and sky preset may also be used interchangeably. In the example of FIG. 1, the replacement image, generated by the image editing apparatus 115 and displayed or returned to user 100, may include a background region (e.g., a sunny sky), which in some cases may also be referred to as a source region, a sky region, etc.

Figure 2:
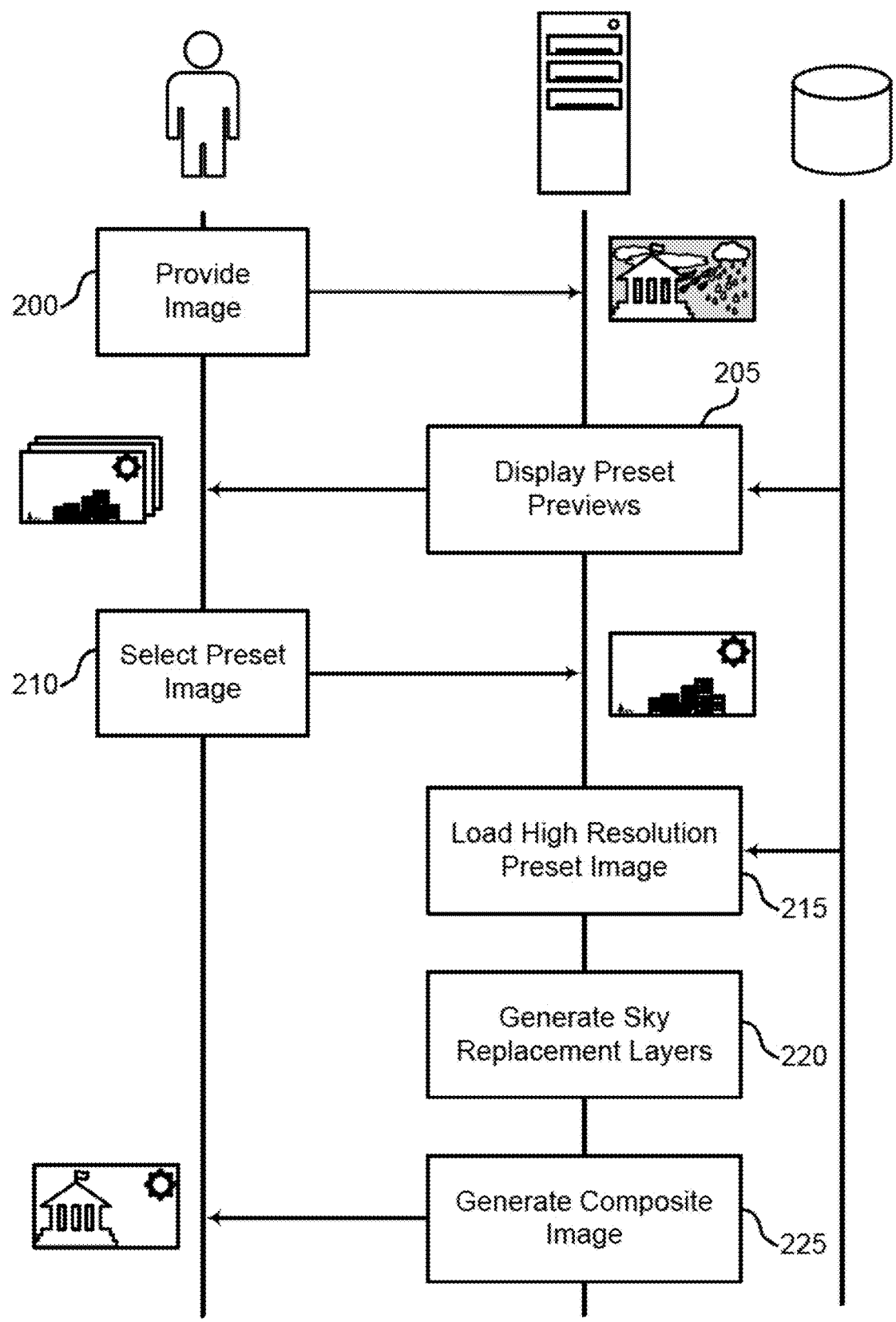
FIG. 2 shows an example of a process for image editing according to aspects of the present disclosure.

FIG. 2 shows an example of a process for image editing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Embodiments of the present disclosure utilize compositing methods that generate high-quality composites without fringing and halo artefacts. In some examples, the methods described herein generate a stack of layers—a hard sky mask, a soft sky mask, a lighting mask, and lighting content—and use carefully selected blending modes to combine them and suppress the halo/fringing. This method may be performed automatically and works well across many sky replacement examples.

Accordingly, a method for image editing is described. Embodiments of the method generate a first region mask, a second region mask, and a third region mask corresponding to a same semantically related region of a first image. Embodiments of the method are further configured to generate a defringing layer by combining the first region mask with grayscale version of the second image, generate a region-specific layer by combining the second region mask and the third region mask to produce a combined region mask, and combine the combined region mask with the second image. Embodiments of the method are further configured to generate a composite image by combining the first image, the defringing layer, and the region-specific layer.

At operation 200, the user provides an original image to the image editing apparatus. In some cases, the operations of this step refer to, or may be performed by, a user as described with reference to FIG. 1. In some cases, the input to the system includes a single image and a preset reference image is applied. In other embodiments, a user selects two images, and a composite is made from the two images. In some cases, the system automatically selects portions of the images for composition (i.e., it can identify and replace a sky region automatically). The original image and the replacement image can be in any of multiple formats (e.g., PNG, JPEG, RAW, etc.).

Furthermore, according to embodiments of the present disclosure, a layer structure is used that provides the non-destructive effect. Some conventional image editing applications only generate a replaced picture (e.g., a new picture with the sky replaced). However, according to embodiments of the present disclosure, an image may be replaced with a composite picture including different layers (i.e., pixel and adjustment layers) with layer masks, which allows users to further adjust the individual component to their preferences (and to undo any unwanted changes).

At operation 205, the system displays preset previews. Thumbnail data of the presets are loaded for preview. The high-resolution data of a preset may not be loaded into the memory until it is selected by the user for sky replacement. The user may preview the presets before selecting. In some cases, the operations of this step refer to, or may be performed by, an image editing apparatus as described with reference to FIGS. 1 and 3.

At operation 210, the user selects a preset image. When a user selects a preset, the regions in the preset image may be detected to find the coordinates for placing a new image into the composition. In some cases, the operations of this step refer to, or may be performed by, a user as described with reference to FIG. 1.

At operation 215, the system loads a high resolution version of the sky image. In some examples, the high resolution image of a preset image may not be loaded into local memory until it is selected by the user for image replacement. In such cases, when a new image preset is selected for image replacement, the high resolution data of the previously selected image preset may be released from the database. In some cases, the operations of this step refer to, or may be performed by, an image editing apparatus as described with reference to FIGS. 1 and 3.

At operation 220, the system generates sky replacement layers. In some cases, the operations of this step refer to, or may be performed by, an image editing apparatus as described with reference to FIGS. 1 and 3. The layer structure may include a layer for the original image, a sky replacement layer (i.e., based on a combination of a foreground mask from the original image and a sky region from the replacement image), a defringing layer (based on a mask from the original image and a grayscale of the replacement sky), and a color harmonization layer. The layer structure is described further with reference to FIG. 5.

At operation 225, the system generates a composite image by combining the layers.

Additionally, an apparatus for performing the method is described. The apparatus includes a processor, memory in electronic communication with the processor, and instructions stored in the memory. The instructions are operable to cause the processor to generate a first region mask, a second region mask, and a third region mask corresponding to a same semantically related region of a first image, generate a defringing layer by combining the first region mask with grayscale version of the second image, generate a region-specific layer by combining the second region mask and the third region mask to produce a combined region mask, and combining the combined region mask with the second image, and generate a composite image by combining the first image, the defringing layer, and the region-specific layer.

A non-transitory computer readable medium storing code for image editing is described. In some examples, the code comprises instructions executable by a processor to: generate a first region mask, a second region mask, and a third region mask corresponding to a same semantically related region of a first image, generate a defringing layer by combining the first region mask with grayscale version of the second image, generate a region-specific layer by combining the second region mask and the third region mask to produce a combined region mask, and combining the combined region mask with the second image, and generate a composite image by combining the first image, the defringing layer, and the region-specific layer.

A system for image editing is described. Embodiments of the system are configured for generating a first region mask, a second region mask, and a third region mask corresponding to a same semantically related region of a first image, generating a defringing layer by combining the first region mask with grayscale version of the second image, generating a region-specific layer by combining the second region mask and the third region mask to produce a combined region mask, and combining the combined region mask with the second image, and generating a composite image by combining the first image, the defringing layer, and the region-specific layer.

Some examples of the method, apparatus, non-transitory computer readable medium, and system described above further include applying a mask brush to adjust the combined region mask. Some examples further include applying a fade edge adjustment, a shift edge adjustment, or both the fade edge adjustment and the shift edge adjustment after applying the mask brush.

Some examples of the method, apparatus, non-transitory computer readable medium, and system described above further include applying the mask brush to further adjust the combined region mask. Some examples further include automatically reapplying the fade edge adjustment, the shift edge adjustment, or both the fade edge adjustment and the shift edge adjustment after reapplying the mask brush.

Some examples of the method, apparatus, non-transitory computer readable medium, and system described above further include generating a color harmonization layer based on the second region mask, wherein the composite image includes the color harmonization layer.

Some examples of the method, apparatus, non-transitory computer readable medium, and system described above further include adjusting a position of the second image relative to the first image. Some examples further include automatically regenerating the defringing layer and the region-specific layer based on the position. Some examples further include automatically regenerating the composite image based on the regenerated defringing layer and the regenerated region-specific layer.

In some examples, the first region mask has a more gradual mask boundary than the second region mask, and the second region mask has a more gradual boundary than the third mask. In some examples, the semantically related region of the first image comprises a first sky region, and the composite image comprises a second sky region from the second image.

Figure 3:
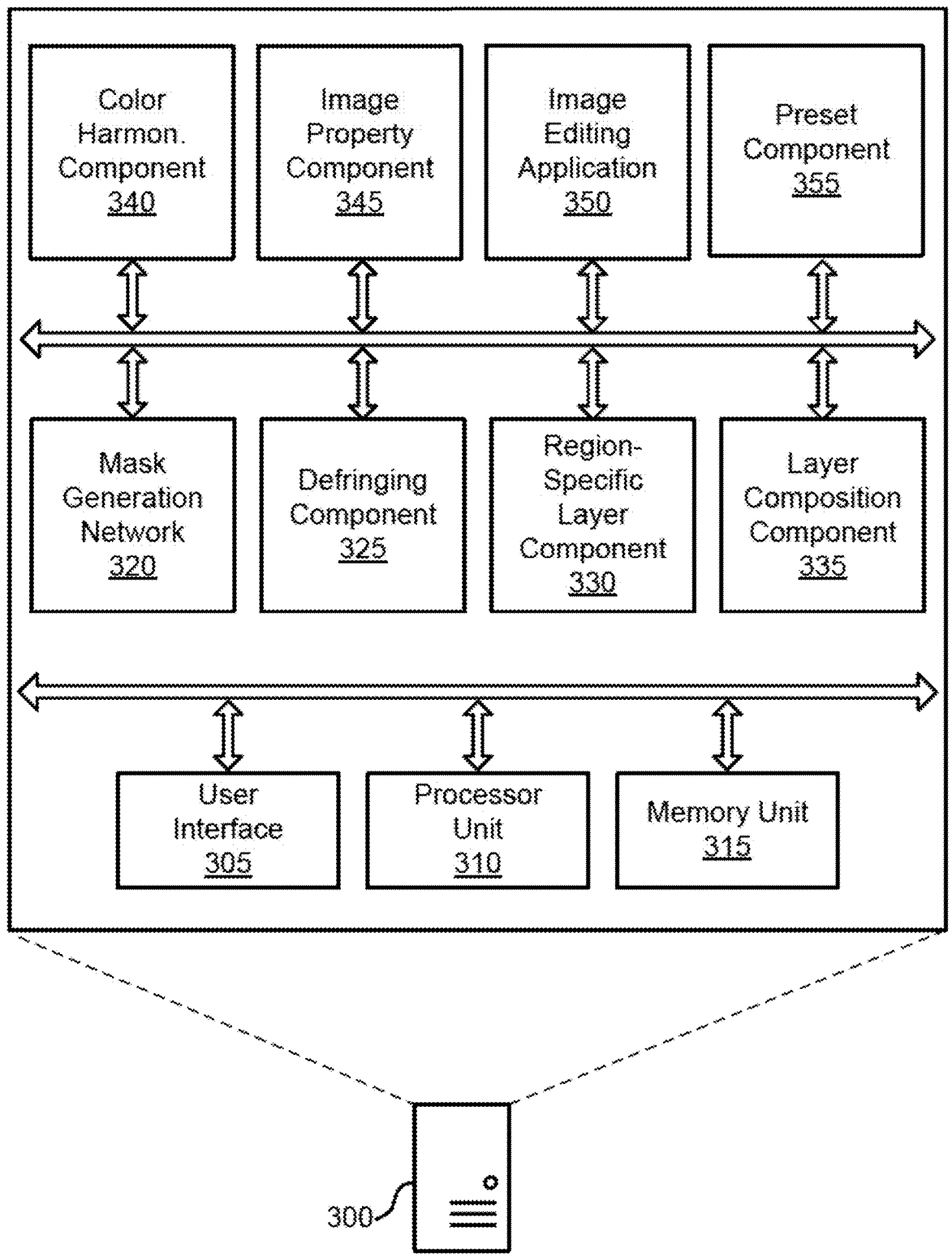
FIG. 3 shows an example of an image editing apparatus according to aspects of the present disclosure.

FIG. 3 shows an example of an image editing apparatus 300 according to aspects of the present disclosure. In one embodiment, image editing apparatus 300 includes user interface 305, processor unit 310, memory unit 315, mask generation network 320, defringing component 325, region-specific layer component 330, layer composition component 335, color harmonization component 340, image property component 345, image editing application 350, and preset component 355. Image editing apparatus 300 is an example of, or includes aspects of, the corresponding element described with reference to FIG. 1.

An apparatus for image editing is described. Embodiments of the apparatus include a mask generation network 320 configured to generate a plurality of region masks for a first image using a mask generation network, where the region masks correspond to a same semantically related region of the first image. Embodiments of the apparatus further include a defringing component 325 configured to generate a defringing layer by combining a first region mask of the plurality of region masks with grayscale version of a second image. Embodiments of the apparatus further include a region-specific layer component 330 configured to generate a region-specific layer by combining a second region mask of the plurality of region masks with the second image. Embodiments of the apparatus further include a layer composition component 335 configured to generate a composite image by combining the first image, the defringing layer, and the region-specific layer.

A user interface 305 may enable a user to interact with a device. In some embodiments, the user interface 305 may include an audio device, such as an external speaker system, an external display device such as a display screen, or an input device (e.g., remote control device interfaced with the user interface 305 directly or through an input/output (IO) controller module). In some cases, a user interface 305 may be a graphical user interface 305 (GUI).

A processor unit 310 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

Examples of a memory unit 315 include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some embodiments, user interface 305 displays a set of low-resolution previews including the at least one low-resolution preview. In some examples, user interface 305 receives feedback indicating the preset image, where the preset image is selected based on the feedback. According to some embodiments, user interface 305 may be configured to display the at least one low-resolution preview and to receive feedback for selecting a preset image from among the plurality of preset images. User interface 305 is an example of, or includes aspects of, the corresponding element described with reference to FIG. 4.

According to some embodiments, mask generation network 320 generates a set of region masks for a first image using a mask generation network 320, where the region masks correspond to a same semantically related region of the first image. In some examples, mask generation network 320 combines the second region mask with a third region mask of the set of region masks to create a combined region mask, where the region-specific layer is generated using the combined region mask. In some examples, the first region mask has a more gradual mask boundary than the second region mask. In some examples, the semantically related region of the first image includes a first sky region, and the composite image includes a second sky region from the second image.

According to some embodiments, mask generation network 320 generates a first region mask, a second region mask, and a third region mask corresponding to a same semantically related region of a first image. In some examples, mask generation network 320 applies a mask brush to adjust the combined region mask. In some examples, mask generation network 320 applies a fade edge adjustment, a shift edge adjustment, or both the fade edge adjustment and the shift edge adjustment after applying the mask brush. In some examples, mask generation network 320 applies the mask brush to further adjust the combined region mask. In some examples, mask generation network 320 automatically reapplies the fade edge adjustment, the shift edge adjustment, or both the fade edge adjustment and the shift edge adjustment after reapplying the mask brush. In some examples, the first region mask has a more gradual mask boundary than the second region mask, and the second region mask has a more gradual boundary than the third mask. In some examples, the semantically related region of the first image includes a first sky region, and the composite image includes a second sky region from the second image.

According to some embodiments, mask generation network 320 may be configured to generate a plurality of region masks for a first image using a mask generation network 320, wherein the region masks correspond to a same semantically related region of the first image.

In some examples, the mask generation network 320 includes a convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In some embodiments, one or more components of the image editing apparatus 300 may include (or implement) one or more aspects of an artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some embodiments, multiple neural networks are used for generating segmentation masks. For example, in one embodiment, the mask generation network 320 may include a model for generating a base mask, one for refining the base mask, and one for detecting difficult regions (e.g., trees or wires). All of the models may be used to generate the following masks: a hard mask (e.g., for the region replacement layer), a soft mask (e.g., for the region replacement layer), and a and a lighting mask (e.g., for the lighting/defringing layer).

According to some embodiments, mask generation network 320 generates a foreground region mask for a first image using a mask generation network 320. The mask generation network 320 may be configured to generate a foreground region mask for a first image. In some examples, the mask generation network 320 includes a convolutional neural network.

According to some embodiments, defringing component 325 generates a defringing layer by combining a first region mask of the set of region masks with grayscale version of a second image. In some examples, the defringing layer is located between the first image and the region-specific layer. In some examples, defringing component 325 adjusts a position of the second image relative to the first image. According to some embodiments, defringing component 325 generates a defringing layer by combining the first region mask with grayscale version of the second image. In some examples, defringing component 325 adjusts a position of the second image relative to the first image. In some examples, defringing component 325 automatically regenerates the defringing layer based on the position.

According to some embodiments, defringing component 325 may be configured to generate a defringing layer by combining a first region mask of the plurality of region masks with grayscale version of a second image. According to some embodiments, defringing component 325 adjusts a position of the second image relative to the first image. In some examples, defringing component 325 generates a defringing layer based on grayscale data of the second image and the output of the mask generation network 320, where the composite image further includes the defringing layer. According to some embodiments, defringing component 325 may be configured to generate a defringing layer based on an output of the mask generation network 320 and grayscale data of the second image.

According to some embodiments, region-specific layer component 330 generates a region-specific layer by combining a second region mask of the set of region masks with the second image. According to some embodiments, region-specific layer component 330 generates a region-specific layer by combining the second region mask and the third region mask to produce a combined region mask, and combining the combined region mask with the second image. According to some embodiments, region-specific layer component 330 may be configured to generate a region-specific layer by combining a second region mask of the plurality of region masks with the second image. In some examples, the region-specific layer component 330 includes a brush tool, a fade edge slider, and a shift edge slider.

According to some embodiments, region-specific layer component 330 generates a background region layer based on the second image and an output of the mask generation network 320, where the composite image includes the first image, the color harmonization layer, and the background region layer. According to some embodiments, region-specific layer component 330 may be configured to generate a background region layer based on an output of the mask generation network 320 and the second image.

According to some embodiments, layer composition component 335 generates a composite image by combining the first image, the defringing layer, and the region-specific layer. In some examples, layer composition component 335 automatically regenerates the composite image based on the adjusted position. According to some embodiments, layer composition component 335 generates a composite image by combining the first image, the defringing layer, and the region-specific layer. In some examples, layer composition component 335 automatically regenerates the composite image based on the regenerated defringing layer and the regenerated region-specific layer. According to some embodiments, layer composition component 335 may be configured to generate a composite image by combining the first image, the defringing layer, and the region-specific layer.

According to some embodiments, color harmonization component 340 generates a color harmonization layer based on at least one of the set of region masks, where the composite image includes the color harmonization layer. According to some embodiments, color harmonization component 340 generates a color harmonization layer based on the second region mask, where the composite image includes the color harmonization layer. According to some embodiments, color harmonization component 340 may be configured to generate a color harmonization layer based on at least one of the plurality of region masks.

According to some embodiments, color harmonization component 340 generates a color harmonization layer based on the foreground property data and the background property data. In some examples, color harmonization component 340 automatically adjusts the color harmonization layer based on the adjusted position. In some examples, color harmonization component 340 automatically adjusts the color harmonization layer based on the adjusted colors. In some examples, color harmonization component 340 computes a set of color harmonization curves, where the color harmonization layer is generated based on the color harmonization curves. In some examples, the color harmonization layer is located between the first image and the background region layer. In some examples, the color harmonization layer applies colors from a background portion of the second image to a foreground portion of the first image.

According to some embodiments, color harmonization component 340 generates a color harmonization layer based on the foreground property data and the background property data. In some examples, color harmonization component 340 automatically adjusts the color harmonization layer based on the change. In some examples, the color harmonization layer applies colors from a background portion of the second image to a foreground portion of the first image.

According to some embodiments, color harmonization component 340 may be configured to generate a color harmonization layer based on the foreground property data and the background property data. In some examples, the color harmonization component 340 is configured to detect a change in the background property data and automatically adjust the color harmonization layer based on the change.

According to some embodiments, image property component 345 computes foreground property data based on the foreground region mask and the first image. In some examples, image property component 345 computes background property data based on a second image. In some examples, the background property data is computed based on an output of the mask generation network 320. According to some embodiments, image property component 345 computes foreground property data based on a foreground region mask and a first image. In some examples, image property component 345 computes background property data based on a second image. In some examples, image property component 345 detects a change in the foreground property data or the background property data. In some examples, the change includes a position change of the second image with respect to the first image. In some examples, the change includes a change in color of the second image. In some examples, the change includes a change in scale of the second image.

According to some embodiments, image property component 345 may be configured to compute foreground property data based on the first image and background property data based on a second image.

According to some embodiments, image editing application 350 edits the composite image using an image editing application 350. According to some embodiments, image editing application 350 generates a composite image based on the first image, the second image, and the color harmonization layer. In some examples, image editing application 350 automatically adjusts the composite image based on the adjusted color harmonization layer. In some examples, image editing application 350 adjusts colors of the second image. In some examples, image editing application 350 automatically adjusts the composite image based on the adjusted color harmonization layer. In some examples, the composite image replaces a first sky region of the first image with a second sky region from the second image.

According to some embodiments, image editing application 350 generates a composite image based on the first image, the second image, and the color harmonization layer. According to some embodiments, image editing application 350 may be configured to generate a composite image based on the first image, the second image, and the color harmonization layer.

Preset component 355 is an example of, or includes aspects of, the corresponding element described with reference to FIG. 4. According to some embodiments, preset component 355 receives original image data. In some examples, preset component 355 retrieves preset information for set of preset images, where the preset information for each of the preset images includes low-resolution image data and region location information. In some examples, the region location information corresponds to a sky region of the preset image. According to some embodiments, preset component 355 loads the preset information from the presets info file. In some examples, preset component 355 selects a preset image from among the set of preset images based on the preset information. In some examples, preset component 355 loads the high-resolution image data for the preset image from one of the separate image files based on the selection. In some examples, the preset information further includes image metadata.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates the transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

A system for image editing is described. The system comprises a mask generation network configured to generate a plurality of region masks for a first image using a mask generation network, wherein the region masks correspond to a same semantically related region of the first image, a defringing component configured to generate a defringing layer by combining a first region mask of the plurality of region masks with grayscale version of a second image, a region-specific layer component configured to generate a region-specific layer by combining a second region mask of the plurality of region masks with the second image, and a layer composition component configured to generate a composite image by combining the first image, the defringing layer, and the region-specific layer.

A method of manufacturing an apparatus for image editing is described. The method provides a mask generation network configured to generate a plurality of region masks for a first image using a mask generation network, wherein the region masks correspond to a same semantically related region of the first image, a defringing component configured to generate a defringing layer by combining a first region mask of the plurality of region masks with grayscale version of a second image, a region-specific layer component configured to generate a region-specific layer by combining a second region mask of the plurality of region masks with the second image, and a layer composition component configured to generate a composite image by combining the first image, the defringing layer, and the region-specific layer.

A method of using an apparatus for image editing is described. The method uses a mask generation network configured to generate a plurality of region masks for a first image using a mask generation network, wherein the region masks correspond to a same semantically related region of the first image, a defringing component configured to generate a defringing layer by combining a first region mask of the plurality of region masks with grayscale version of a second image, a region-specific layer component configured to generate a region-specific layer by combining a second region mask of the plurality of region masks with the second image, and a layer composition component configured to generate a composite image by combining the first image, the defringing layer, and the region-specific layer.

In some examples, the mask generation network comprises a CNN. As described herein, a CNN is a class of neural network that is commonly used in computer vision or image classification systems. In some examples, the region-specific layer component comprises a brush tool, a fade edge slider, and a shift edge slider. Some examples of the apparatus, system, and method described above further include a color harmonization component configured to generate a color harmonization layer based on at least one of the plurality of region masks.

Figure 4:
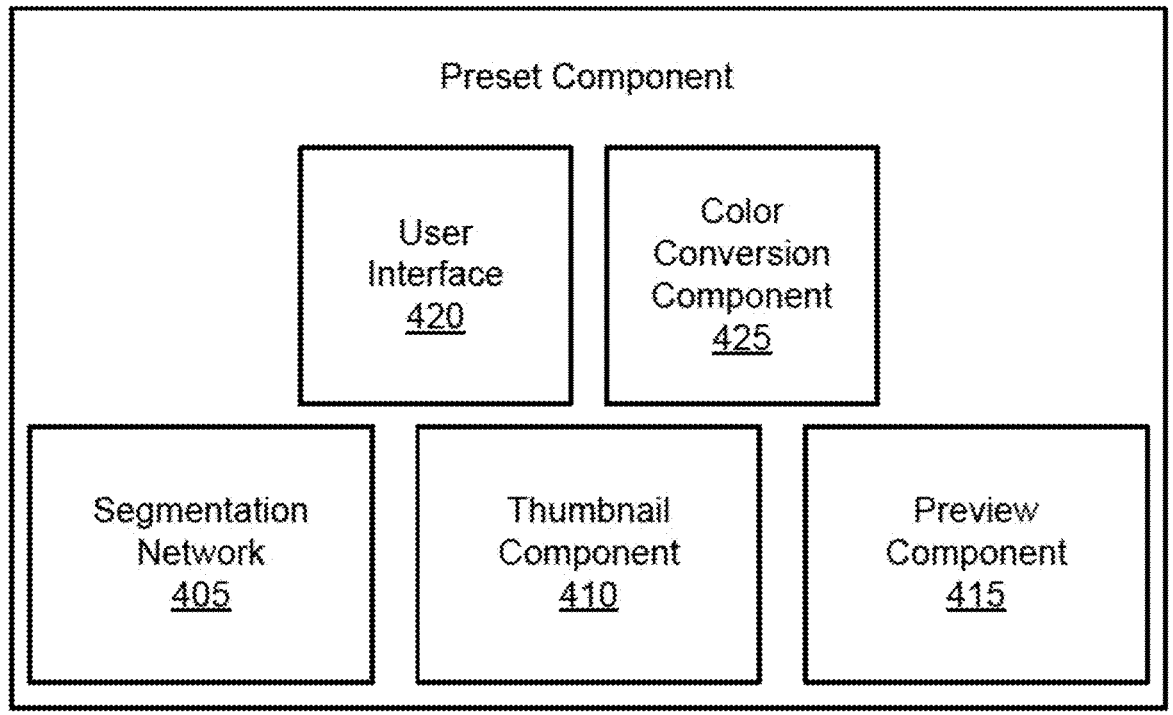
FIG. 4 shows an example of a preset component according to aspects of the present disclosure.

FIG. 4 shows an example of a preset component 400 according to aspects of the present disclosure. Preset component 400 is an example of, or includes aspects of, the corresponding element described with reference to FIG. 3. In one embodiment, preset component 400 includes segmentation network 405, thumbnail component 410, preview component 415, user interface 420, and color conversion component 425.

According to some embodiments, segmentation network 405 performs a segmentation operation on the high-resolution image data to produce the region location information. In some examples, the region location information includes bounding box information. According to some embodiments, segmentation network 405 performs a segmentation information on each of a set of preset images to produce region location information. In some examples, the region location information includes bounding box information. According to some embodiments, segmentation network 405 may be configured to generate region location information for a plurality of preset images. In some examples, the segmentation network 405 includes a CNN.

According to some embodiments, thumbnail component 410 generates at least one low-resolution preview based on the original image data and the preset information. According to some embodiments, thumbnail component 410 generates low-resolution image data for each of the preset images. According to some embodiments, thumbnail component 410 may be configured to generate low-resolution image data for the preset images.

According to some embodiments, preview component 415 selects a preset image from among the set of preset images based on the at least one low-resolution preview image. In some examples, the low-resolution preview includes at least one region of the corresponding preset image combined with at least one region of the original image data. According to some embodiments, preview component 415 may be configured to generate at least one low-resolution preview based on the preset information.

User interface 420 is an example of, or includes aspects of, the corresponding element described with reference to FIG. 3.

According to some embodiments, color conversion component 425 loads high-resolution image data for the selected preset image. In some examples, color conversion component 425 performs color conversion on the high-resolution image data based on the original image data. According to some embodiments, color conversion component 425 performs color conversion on the preset images to produce the high-resolution image data. According to some embodiments, color conversion component 425 may be configured to perform color conversion on the preset images to produce the high-resolution image data.

Figure 5:
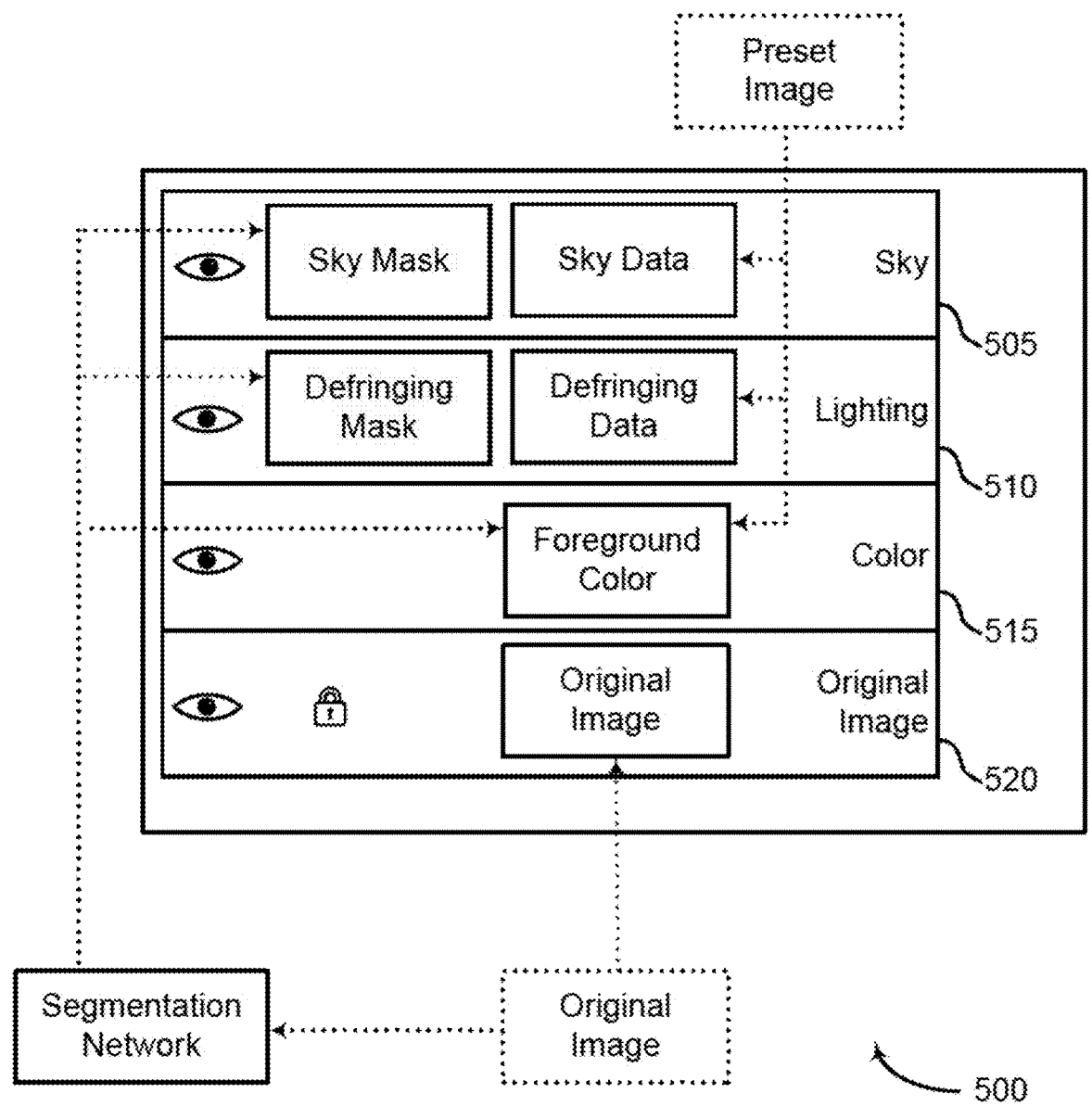
FIG. 5 shows an example of a horizon adjustment process according to aspects of the present disclosure.

FIG. 5 shows an example of a horizon adjustment process according to aspects of the present disclosure. In one embodiment, layers panel 500 includes sky layer display 505, foreground lighting layer display 510, foreground color harmonization layer display 515, and original image layer 520.

Embodiments of the present disclosure provide tools to allow users to adjust a mask both globally (with a fade edge slider) and locally (i.e., with brush tool) to adjust the masks in different modes with precise control on finer details. In conjunction with the layers, an embodiment provides editing controls where users may adjust the composite image. In some examples, an automatic method initializes the control parameters, and the user can fine-tune them. In the example of FIG. 5, a layers panel 500 may include sky layer display 505, foreground lighting layer display 510, foreground color harmonization layer display 515, and original image layer 520, which may display corresponding image editing aspects described herein.

Region Replacement Layer

Figure 6:
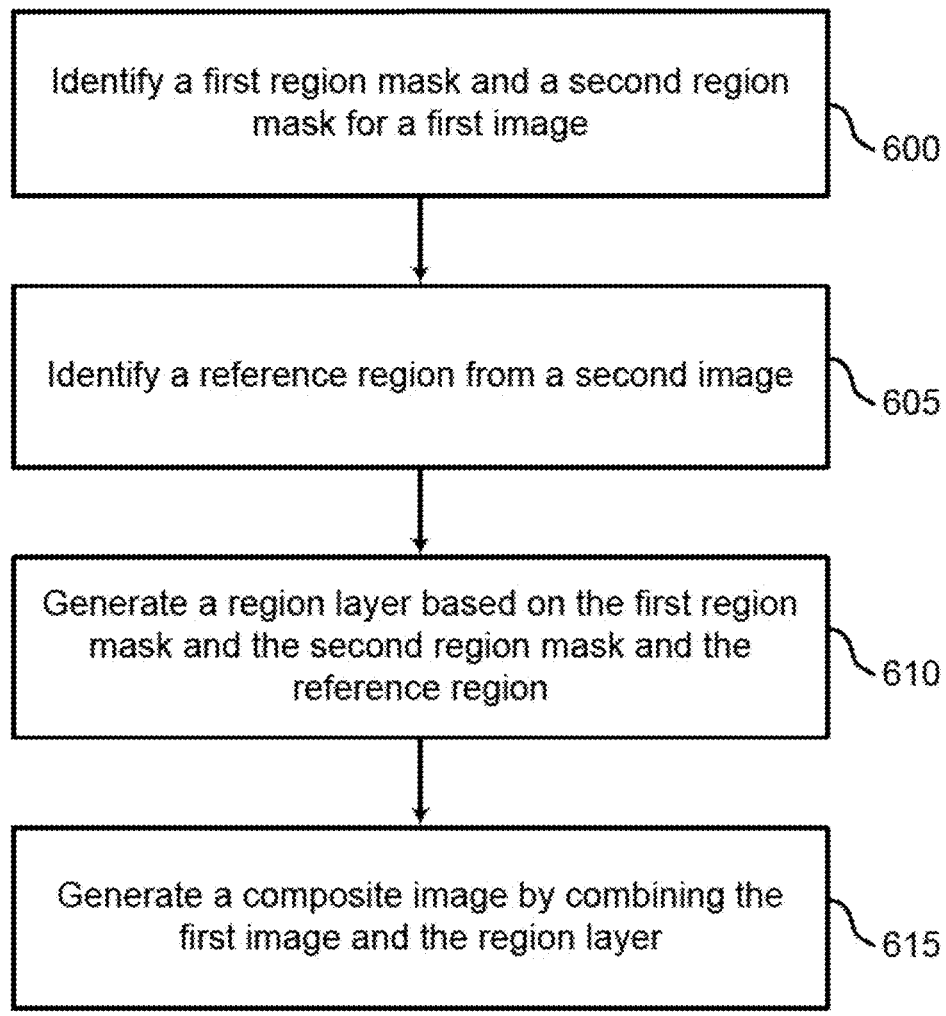
FIG. 6 shows an example of a region layer flowchart according to aspects of the present disclosure.

FIG. 6 shows an example of a region layer flowchart according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system identifies a first region mask and a second region mask for a first image, where the first region mask indicates a semantically related portion of the image, and where the second region mask indicates the semantically related portion of the image with a softer boundary than the first region mask. In some cases, the operations of this step refer to, or may be performed by, a mask generation network as described with reference to FIG. 3.

At operation 605, the system identifies a reference region from a second image. In some cases, the operations of this step refer to, or may be performed by, a region-specific layer component as described with reference to FIG. 3.

At operation 610, the system generates a region layer based on the first region mask and the second region mask and the reference region. In some cases, the operations of this step refer to, or may be performed by, a region-specific layer component as described with reference to FIG. 3.

At operation 615, the system generates a composite image by combining the first image and the region layer. In some cases, the operations of this step refer to, or may be performed by, an image composition component as described with reference to FIG. 1.

Figure 7:
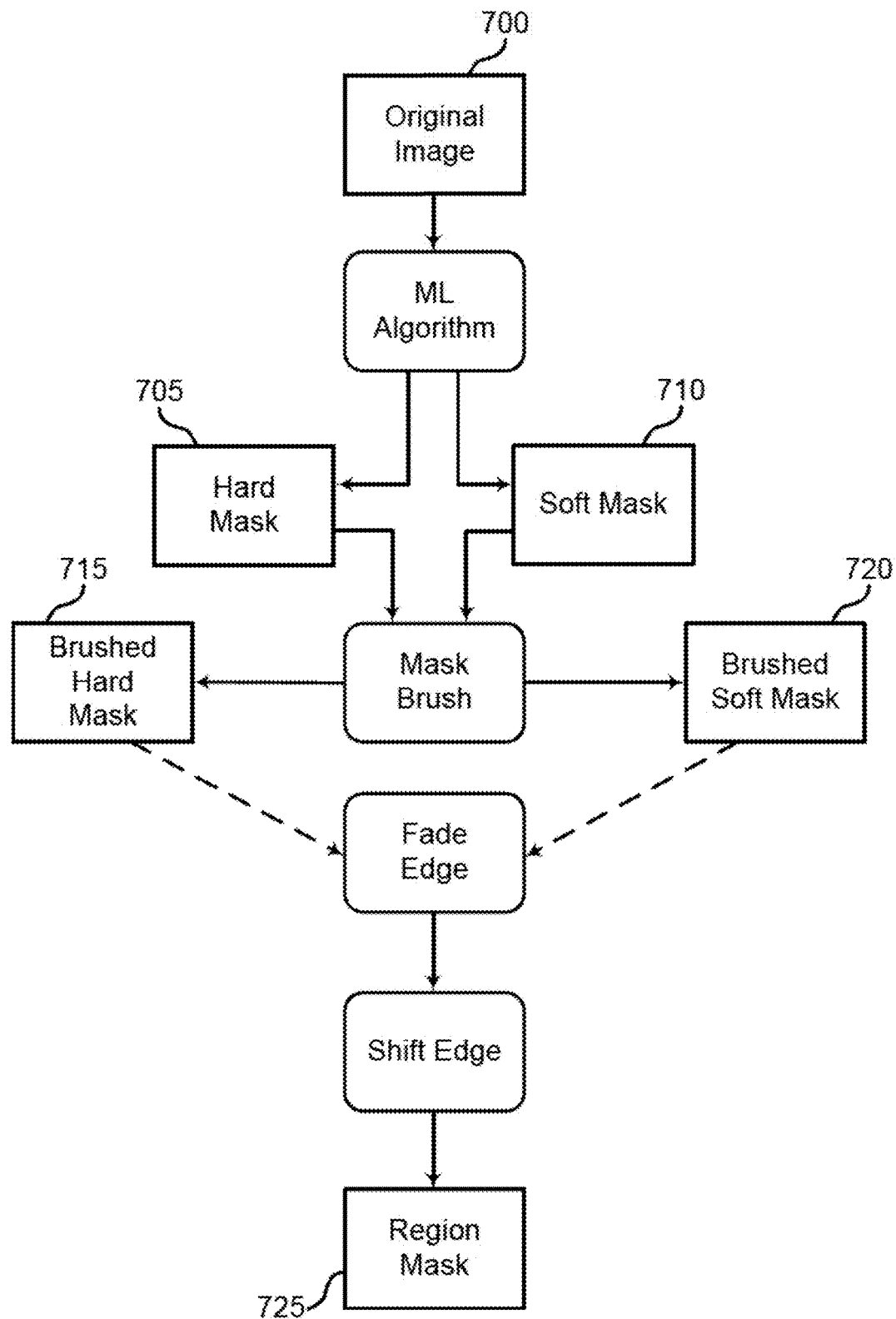
FIG. 7 shows an example of a region layer diagram according to aspects of the present disclosure.

FIG. 7 shows an example of a region layer diagram according to aspects of the present disclosure. The example shown includes original image 700, hard mask 705, soft mask 710, brushed hard mask 715, brushed soft mask 720, and region mask 725. Region mask 725 is an example of, or includes aspects of, the corresponding element described with reference to FIG. 9.

The hard mask 705 and the soft mask 710 may then be manually edited by a user using a mask brush to create a brushed hard mask 715 and a brushed soft mask 720, respectively. Then, a mask blending process is used to combine the brushed hard mask 715 and the brushed soft mask 720 into a single mask. For example, the mask blending process may take a weighted average of the two masks. In some cases, user editable parameters may determine how the two masks are blended. In some examples, a fade edge process and a shift edge process may be used to blend the brushed hard mask 715 and the brushed soft mask 720. The blending process can be used to adjust a boundary region (i.e., areas of the resulting mask that are not binary) in either direction (i.e., to reveal more background or more foreground). The fade edge process and the shift edge process may also be user controllable.

The mask that results from combining and editing the brushed hard mask 715 and a brushed soft mask 720 may be referred to as a region mask 725 (or a sky layer in the case of sky replacement). In addition to the region mask 725, the region layer may also include a selected region from a reference image (i.e., the image that will be masked prior to combining with the original image). In some cases, the reference image may be moved or repositioned (either automatically or dynamically by the user) so that a different portion is visible through the region mask. In the sky replacement example, the horizon of the reference image may be positioned to align with the horizon of the original image as described herein.

According to an embodiment, both global and local edits to the masks can coexist and be performed in any order without loss of any edit. Local edits (e.g., using the mask brush tool) give fine control to improve the result and fix defects in the generated masks. Local edits are applied to copies of the original hard mask 705 and soft mask 710 (e.g., which may result in brushed hard mask 715 and brushed soft mask 720). In some examples, two painted masks are blended together (i.e., according to a fade edge setting) to form a combined region mask. Then, a shift edge is applied to the combined mask. Fade edge and shift edge settings can be adjusted without losing the brush edits (e.g., resulting in region mask 725).

Defringing (Lighting) Layer

Figure 8:
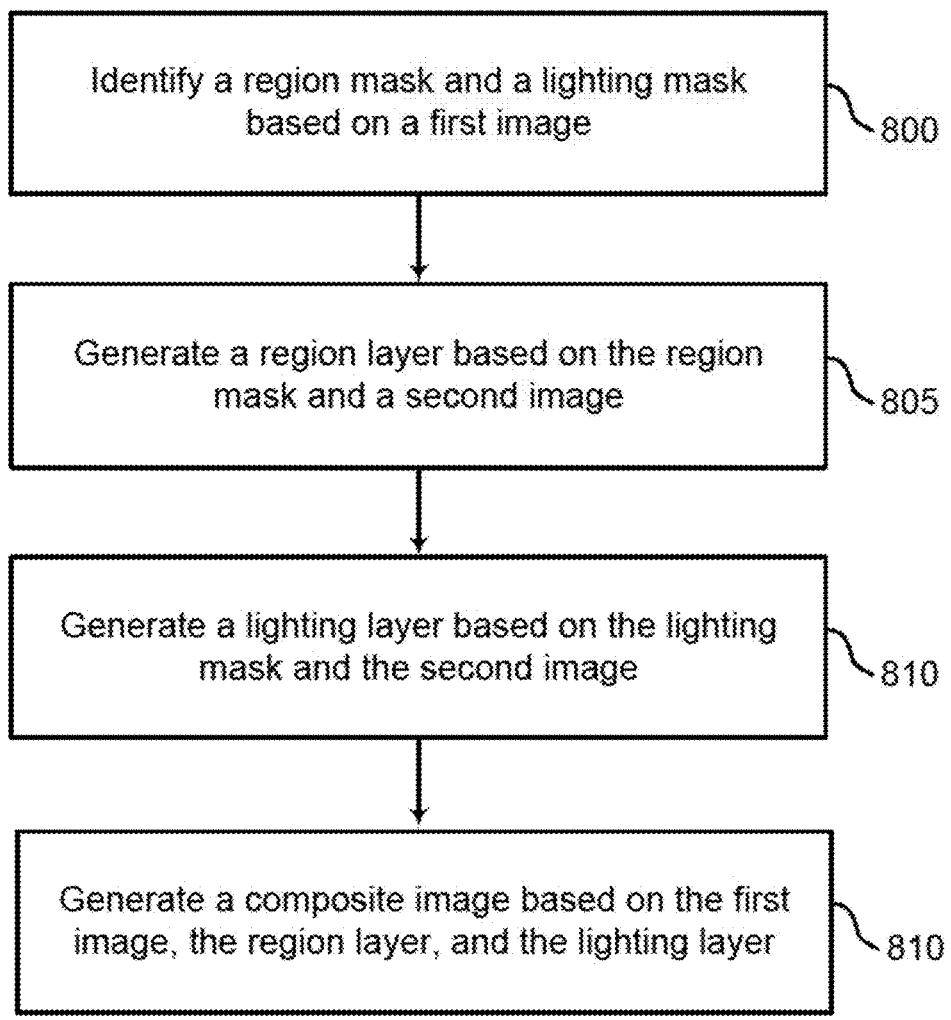
FIG. 8 shows an example of a lighting layer flowchart according to aspects of the present disclosure.

FIG. 8 shows an example of a lighting layer flowchart according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 800, the system identifies a region mask and a lighting mask based on a first image. In some cases, the operations of this step refer to, or may be performed by, a mask generation network as described with reference to FIG. 3.

At operation 805, the system generates a region layer based on the region mask and a second image. In some cases, the operations of this step refer to, or may be performed by, a region-specific layer component as described with reference to FIG. 3.

At operation 810, the system generates a lighting layer based on the lighting mask and the second image. In some cases, the operations of this step refer to, or may be performed by, a region-specific layer component as described with reference to FIG. 3.

At operation 815, the system generates a composite image based on the first image, the region layer, and the lighting layer. In some cases, the operations of this step refer to, or may be performed by, a layer composition component as described with reference to FIG. 3.

Figure 9:
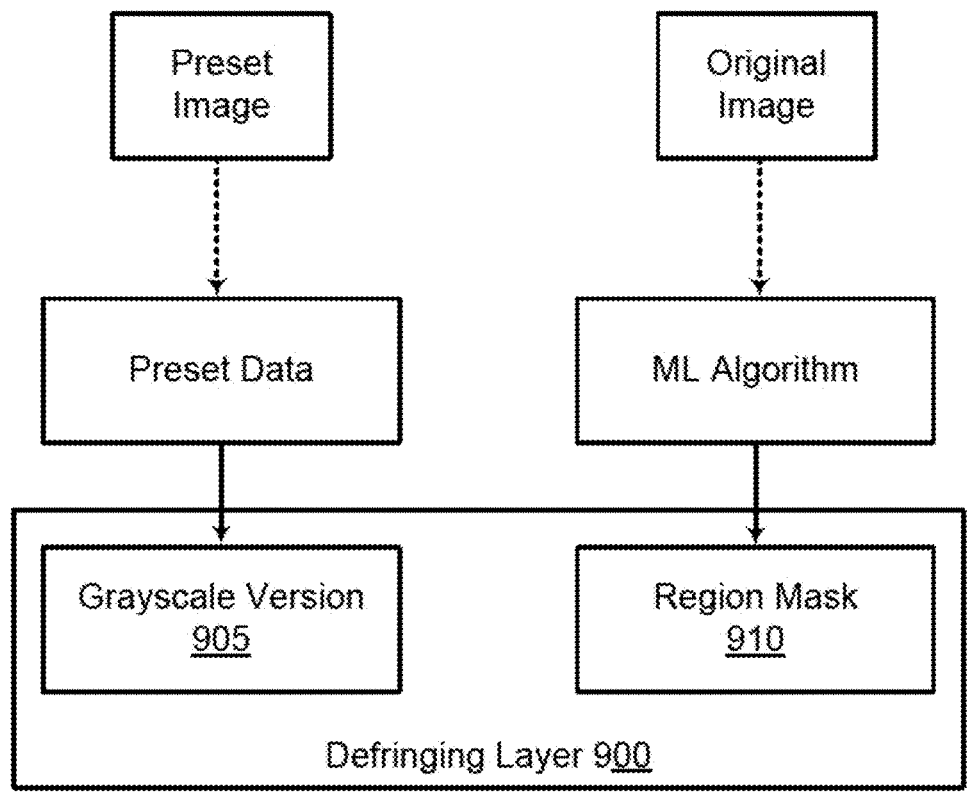
FIG. 9 shows an example of a lighting layer diagram according to aspects of the present disclosure.

FIG. 9 shows an example of a defringing layer diagram according to aspects of the present disclosure. In one embodiment, defringing layer 900 includes grayscale version 905 and region mask 910. Region mask 910 is an example of, or includes aspects of, the corresponding element described with reference to FIG. 7.

FIG. 9 shows an example of a defringing layer diagram according to aspects of the present disclosure. According to certain embodiments, a ML algorithm may create a region mask 910 (which represents the extent of lighting from the background region). In some cases, the boundary between non-lighting area and defringing region in the defringing layer mask corresponds roughly to the boundary between foreground and background, but the transition is even more blurry or extended than in the soft mask.

The region mask 910 may be combined with a grayscale version 905 of the positioned reference image to generate a defringing layer 900. In some cases, the grayscale version 905 may be arranged between a layer including the original image and the replacement region layer (e.g., mask that results from combining and editing the hard mask and the soft mask, or a sky layer in the case of sky replacement) in an image editing application. In some embodiments, the grayscale version 905 is a blurred image of the positioned reference image.

A machine learning model may also create a lighting layer mask (which represents the extent of lighting from the background region). In some cases, the boundary between a non-lighting area and lighting region in the lighting layer mask corresponds roughly to the boundary between foreground and background, but the transition is even more blurry or extended than in the soft mask.

A lighting mask may be combined with a grayscale version of the positioned reference image to generate a lighting layer. In some examples the lighting layer may be arranged between a layer including the original image and the replacement region layer (e.g., the mask that results from combining and editing the hard mask and the soft mask, or a sky layer in the case of sky replacement) in an image editing application.

A portion of the sky visible based on the relative position of the reference image and the original image may be used to generate background property data (e.g., sky property data). This data may also depend on user edits (e.g., edits to the tone, saturation, brightness, or color composition of the sky region of the reference image). Foreground property may also be determined based on the hard or soft mask and the original image. The foreground property data and the background property data may be used to generate a harmonization layer. The harmonization layer may adjust the color of the foreground so that it looks more natural with the new background (i.e., so that a landscape will look more natural with a different sky).

In some examples, a harmonization layer may be arranged between the lighting layer and a layer including the original image in an image editing application. In other examples, the harmonization layer may be arranged between the replacement region layer and the layer containing the original image. In some cases, a scaled down version of the reference image and the original image (or the corresponding regions or masks) may be used when determining the harmonization layer to improve computational efficiency.

Figure 10:
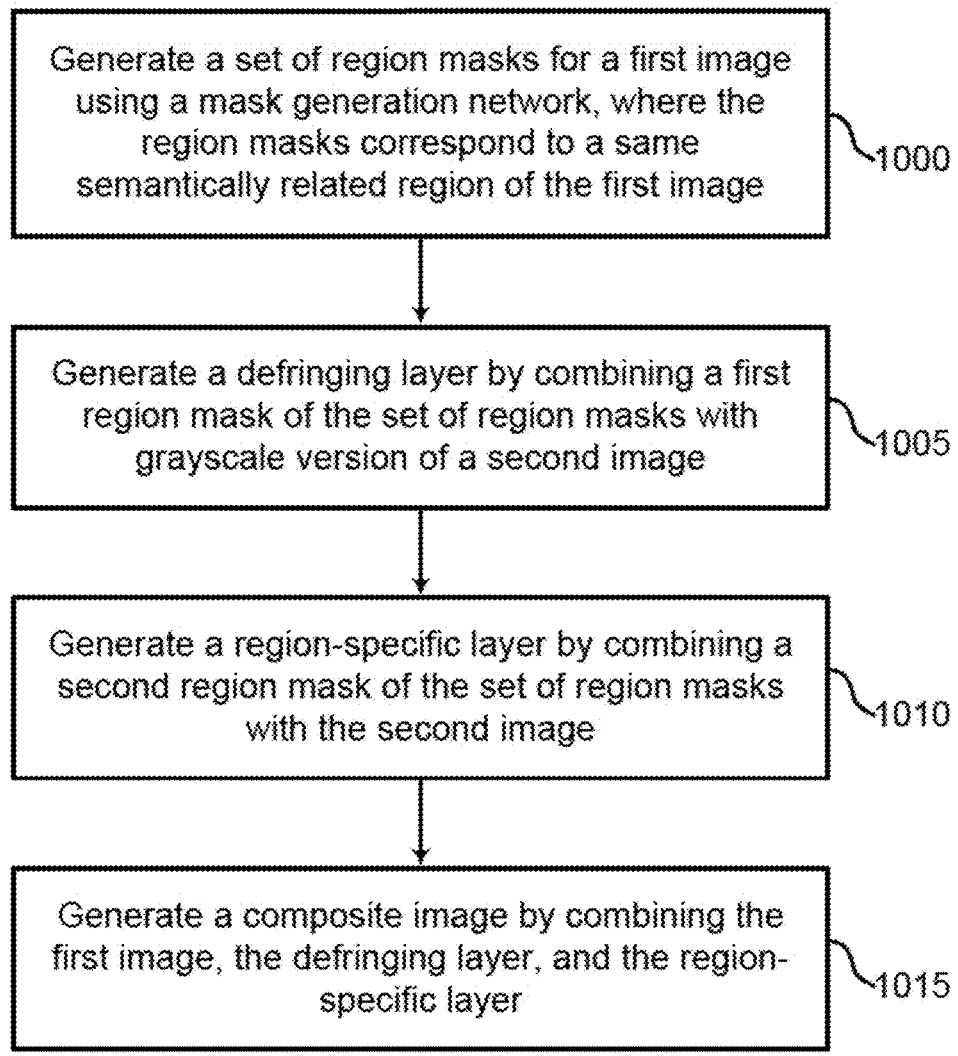
FIGS. 10 through 11 show examples of a process for generating a composite image according to aspects of the present disclosure.

FIG. 10 shows an example of a process for generating a composite image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for image editing is described. Embodiments of the method are configured to generate a plurality of region masks for a first image using a mask generation network, where the region masks correspond to a same semantically related region of the first image. Embodiments of the method are further configured to generate a defringing layer by combining a first region mask of the plurality of region masks with grayscale version of a second image, generate a region-specific layer by combining a second region mask of the plurality of region masks with the second image, and generate a composite image by combining the first image, the defringing layer, and the region-specific layer.

At operation 1000, the system generates a set of region masks for a first image using a mask generation network, where the region masks correspond to a same semantically related region of the first image. In some cases, the operations of this step refer to, or may be performed by, a mask generation network as described with reference to FIG. 3.

At operation 1005, the system generates a defringing layer by combining a first region mask of the set of region masks with grayscale version of a second image. In some cases, the operations of this step refer to, or may be performed by, a defringing component as described with reference to FIG. 3.

At operation 1010, the system generates a region-specific layer by combining a second region mask of the set of region masks with the second image. In some cases, the operations of this step refer to, or may be performed by, a region-specific layer component as described with reference to FIG. 3.

At operation 1015, the system generates a composite image by combining the first image, the defringing layer, and the region-specific layer. In some cases, the operations of this step refer to, or may be performed by, a layer composition component as described with reference to FIG. 3.

An apparatus for image editing is also described. The apparatus includes a processor, memory in electronic communication with the processor, and instructions stored in the memory. The instructions are operable to cause the processor to generate a plurality of region masks for a first image using a mask generation network, wherein the region masks correspond to a same semantically related region of the first image, generate a defringing layer by combining a first region mask of the plurality of region masks with grayscale version of a second image, generate a region-specific layer by combining a second region mask of the plurality of region masks with the second image, and generate a composite image by combining the first image, the defringing layer, and the region-specific layer.

A non-transitory computer readable medium storing code for image editing is also described. In some examples, the code comprises instructions executable by a processor to: generate a plurality of region masks for a first image using a mask generation network, wherein the region masks correspond to a same semantically related region of the first image, generate a defringing layer by combining a first region mask of the plurality of region masks with grayscale version of a second image, generate a region-specific layer by combining a second region mask of the plurality of region masks with the second image, and generate a composite image by combining the first image, the defringing layer, and the region-specific layer.

A system for image editing is also described. Embodiments of the system are configured for generating a plurality of region masks for a first image using a mask generation network, wherein the region masks correspond to a same semantically related region of the first image, generating a defringing layer by combining a first region mask of the plurality of region masks with grayscale version of a second image, generating a region-specific layer by combining a second region mask of the plurality of region masks with the second image, and generating a composite image by combining the first image, the defringing layer, and the region-specific layer.

Some examples of the method, apparatus, non-transitory computer readable medium, and system described above further include combining the second region mask with a third region mask of the plurality of region masks to create a combined region mask, wherein the region-specific layer is generated using the combined region mask.

Some examples of the method, apparatus, non-transitory computer readable medium, and system described above further include generating a color harmonization layer based on at least one of the plurality of region masks, wherein the composite image includes the color harmonization layer. In some examples, the first region mask has a more gradual mask boundary than the second region mask. In some examples, the defringing layer is located between the first image and the region-specific layer. Some examples of the method, apparatus, non-transitory computer readable medium, and system described above further include adjusting a position of the second image relative to the first image. Some examples further include automatically regenerating the composite image based on the adjusted position.

Some examples of the method, apparatus, non-transitory computer readable medium, and system described above further include editing the composite image using an image editing application. Some examples of the method, apparatus, non-transitory computer readable medium, and system described above further include selecting the second image from among a plurality of candidate images for replacing the semantically related region of the first image. In some examples, the semantically related region of the first image comprises a first sky region, and the composite image comprises a second sky region from the second image.

Color Harmonization Layer

Figure 11:
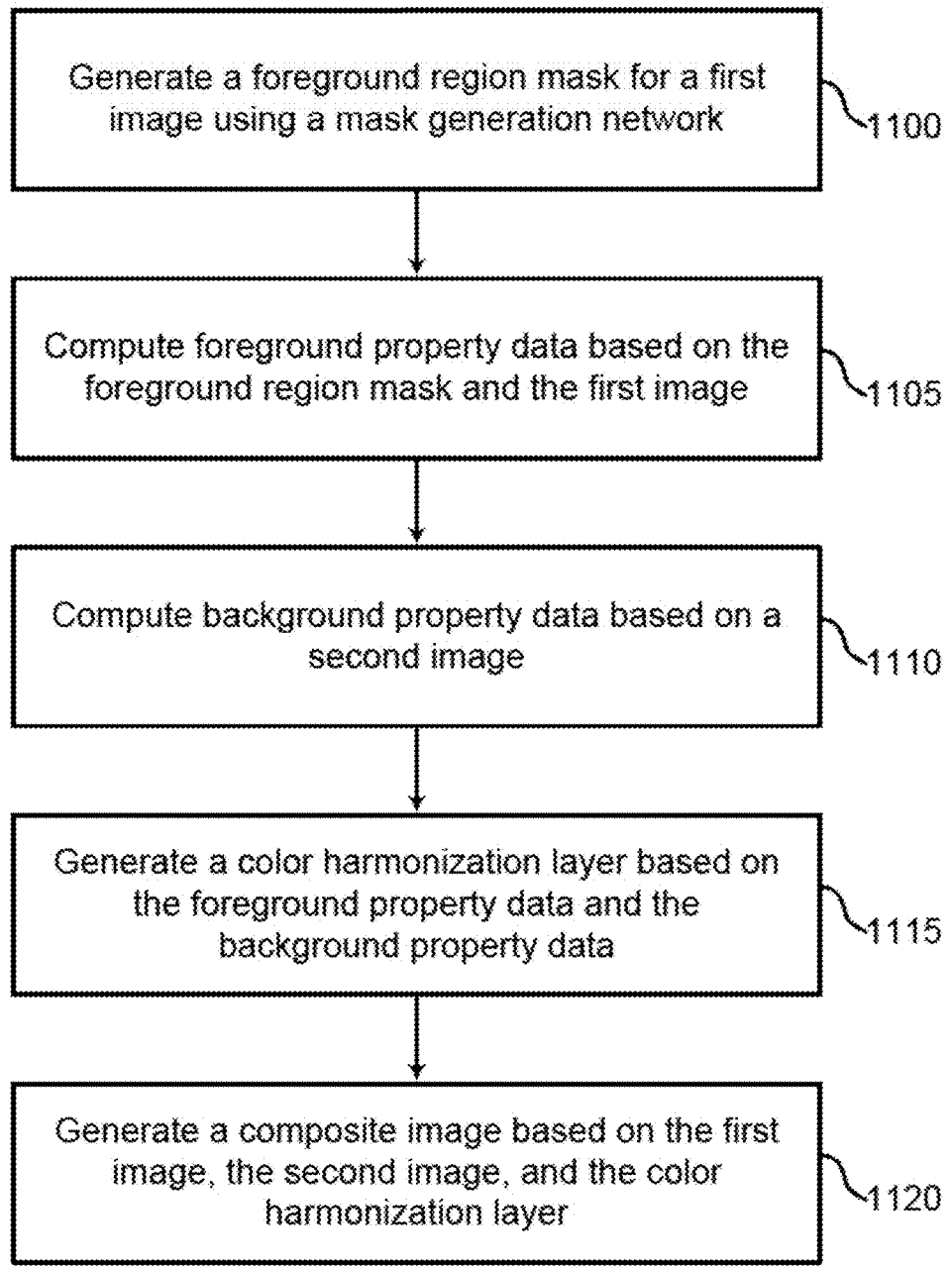

FIG. 11 shows an example of a process for generating a composite image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1100, the system generates a foreground region mask for a first image using a mask generation network. In some cases, the operations of this step refer to, or may be performed by, a mask generation network as described with reference to FIG. 3.

At operation 1105, the system computes foreground property data based on the foreground region mask and the first image. In some cases, the operations of this step refer to, or may be performed by, an image property component as described with reference to FIG. 3.

At operation 1110, the system computes background property data based on a second image. In some cases, the operations of this step refer to, or may be performed by, an image property component as described with reference to FIG. 3.

At operation 1115, the system generates a color harmonization layer based on the foreground property data and the background property data. In some cases, the operations of this step refer to, or may be performed by, a color harmonization component as described with reference to FIG. 3.

At operation 1120, the system generates a composite image based on the first image, the second image, and the color harmonization layer. In some cases, the operations of this step refer to, or may be performed by, an image editing application as described with reference to FIG. 3.

Figure 12:
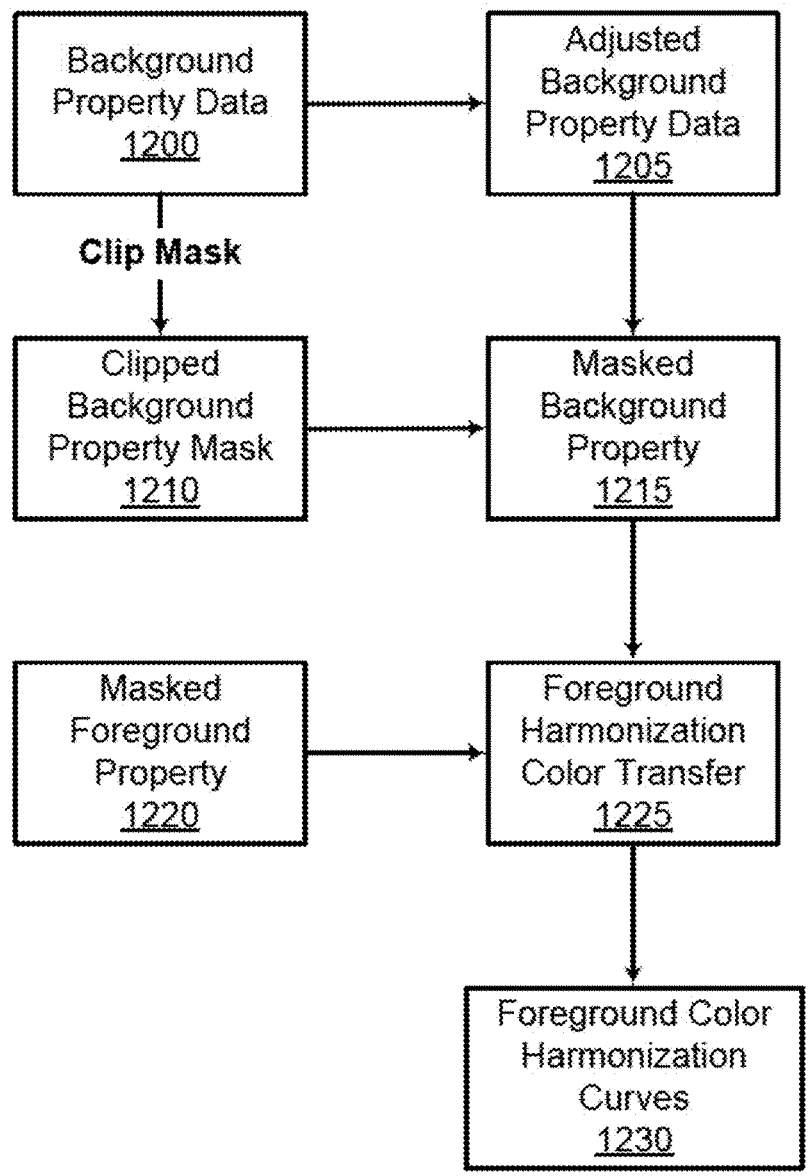
FIG. 12 shows an example of a process for color harmonization according to aspects of the present disclosure.

FIG. 12 shows an example of a process for color harmonization according to aspects of the present disclosure. The example shown includes background property data 1200, adjusted background property data 1205, clipped background property mask 1210, masked background property 1215, masked foreground property 1220, foreground harmonization color transfer 1225, and foreground color harmonization curves 1230.

According to a sky replacement example, the portion of the sky visible based on the relative position of the reference image and the original image may be used to generate background property data 1200. The background property may be adjusted to produce adjusted background property data 1205. In an example scenario, an adjustment to the position of the background may produce adjusted background property data 1205.

A clip mask may be applied to the background property data 1200 to produce a clipped background property mask 1210. The adjusted background property data 1205 and the clipped background property mask 1210 may be used to create a masked background property 1215.

The background property data 1200 may depend on user edits (e.g., edits to the tone, saturation, brightness, or color composition of the sky region of the reference image). Masked foreground property 1220 may also be determined based on the hard or soft mask and the original image. The masked foreground property 1220 and the masked background property 1215 may be used to generate a harmonization layer comprising foreground harmonization color transfer 1225 and foreground color harmonization curves 1230. The harmonization layer may adjust the color of the foreground so that it looks more natural with the new background (i.e., so that a landscape will look more natural with a different sky).

In some examples, the harmonization layer may be arranged between the defringing layer and a layer including the original image in an image editing application. In other examples the harmonization layer may be arranged between the replacement region layer and the layer containing the original image. In some cases, a scaled down version of the reference image and the original image (or the corresponding regions or masks) may be used when determining the harmonization layer to improve computational efficiency.

Some embodiments of the present disclosure provide real-time harmonization based on the visible sky region. When the sky is moved, the change is detected, and the foreground harmonization is applied accordingly to show natural composition on canvas.

Preset Loading

High resolution preset images (e.g., images used for sky replacement) can cause bottlenecks for loading and saving. For example, loading and saving 25 presets can take 10-15 seconds. Furthermore, memory usage can be high when presets are loaded. Accordingly, embodiments of the present disclosure include systems and techniques for preset loading.

In one example, sky replacement presets are color images of high resolutions (e.g., 6000×4500). As discussed above, this can pose challenges for loading and saving performance, and memory usage efficiency. Traditional preset representation techniques were designed for patterns, gradients, and styles where the representation data for the preset types are smaller sizes (e.g., 946×946 for patterns). Thus, FIGS. 13-16 describe efficient techniques for loading preset images (e.g., sky presets).

The representation of a preset comprises multiple files. For example, the metadata and thumbnails for all of the presets can be stored in a single presets info file, while high-resolution image data for the presets can represented in separate JPEG or PNG files. At runtime, the single presets info file including metadata and thumbnails is read initially, and preset thumbnails are shown for preview. When a preset is selected, high-resolution image data of the preset is loaded (i.e., lazy loading), and when another preset is selected, the high-resolution image data of the previous preset is released from memory. When a preset is deleted or created, the corresponding JPEG or PNG file is deleted or created, and the single presets info file (i.e., the file including the metadata and thumbnails) is updated.

Figure 13:
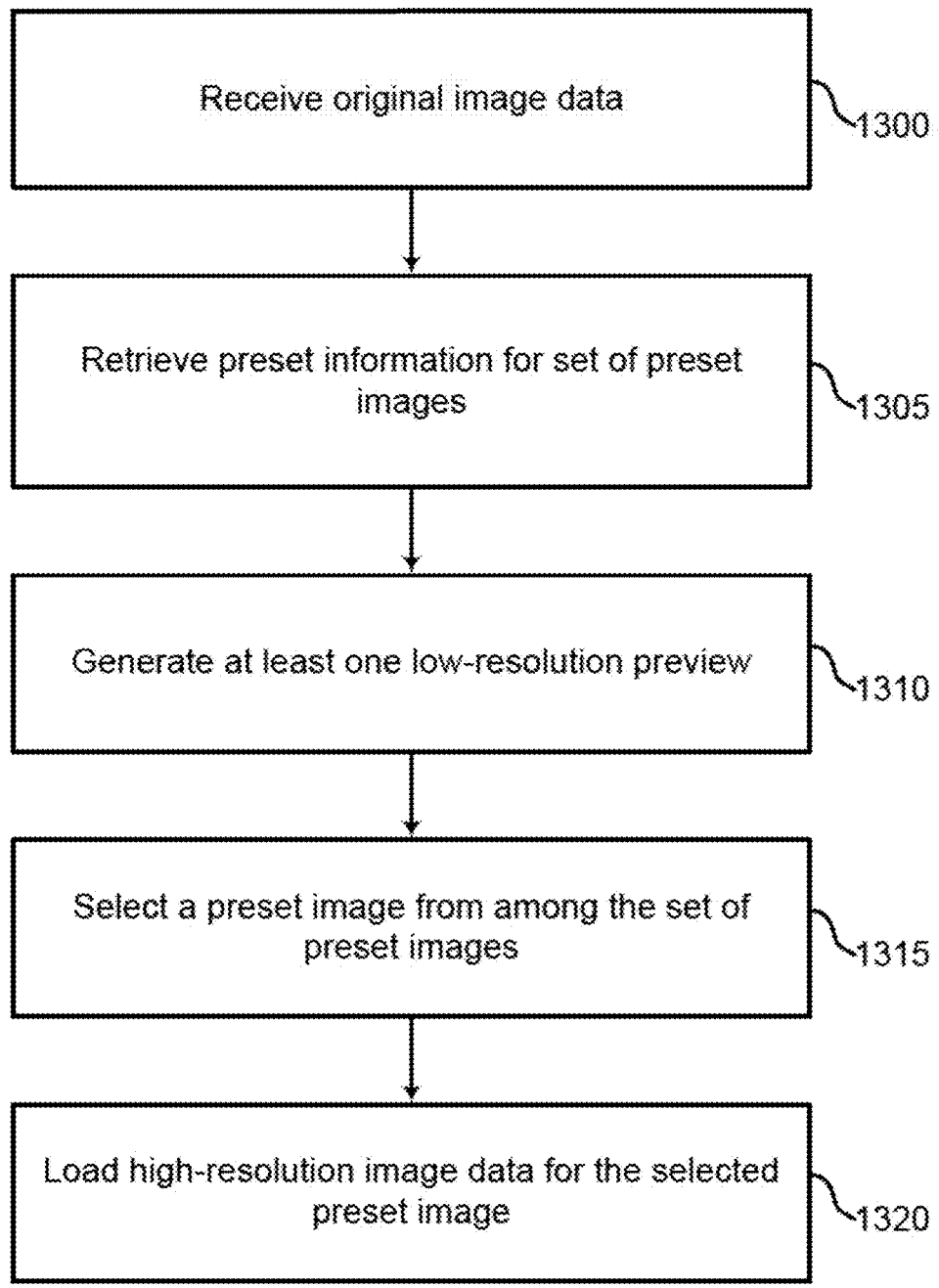
FIGS. 13 through 14 show examples of a process for image editing according to aspects of the present disclosure.

FIG. 13 shows an example of a process for image editing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1300, the system receives original image data. In some cases, the operations of this step refer to, or may be performed by, a preset component as described with reference to FIGS. 3 and 4.

At operation 1305, the system retrieves preset information for set of preset images, where the preset information for each of the preset images includes low-resolution image data and region location information. In some cases, the operations of this step refer to, or may be performed by, a preset component as described with reference to FIGS. 3 and 4.

At operation 1310, the system generates at least one low-resolution preview based on the original image data and the preset information. In some cases, the operations of this step refer to, or may be performed by, a thumbnail component as described with reference to FIG. 4.

At operation 1315, the system selects a preset image from among the set of preset images based on the at least one low-resolution preview image. In some cases, the operations of this step refer to, or may be performed by, a preview component as described with reference to FIG. 4.

At operation 1320, the system loads high-resolution image data for the selected preset image. In some cases, the operations of this step refer to, or may be performed by, a color conversion component as described with reference to FIG. 4.

Figure 14:
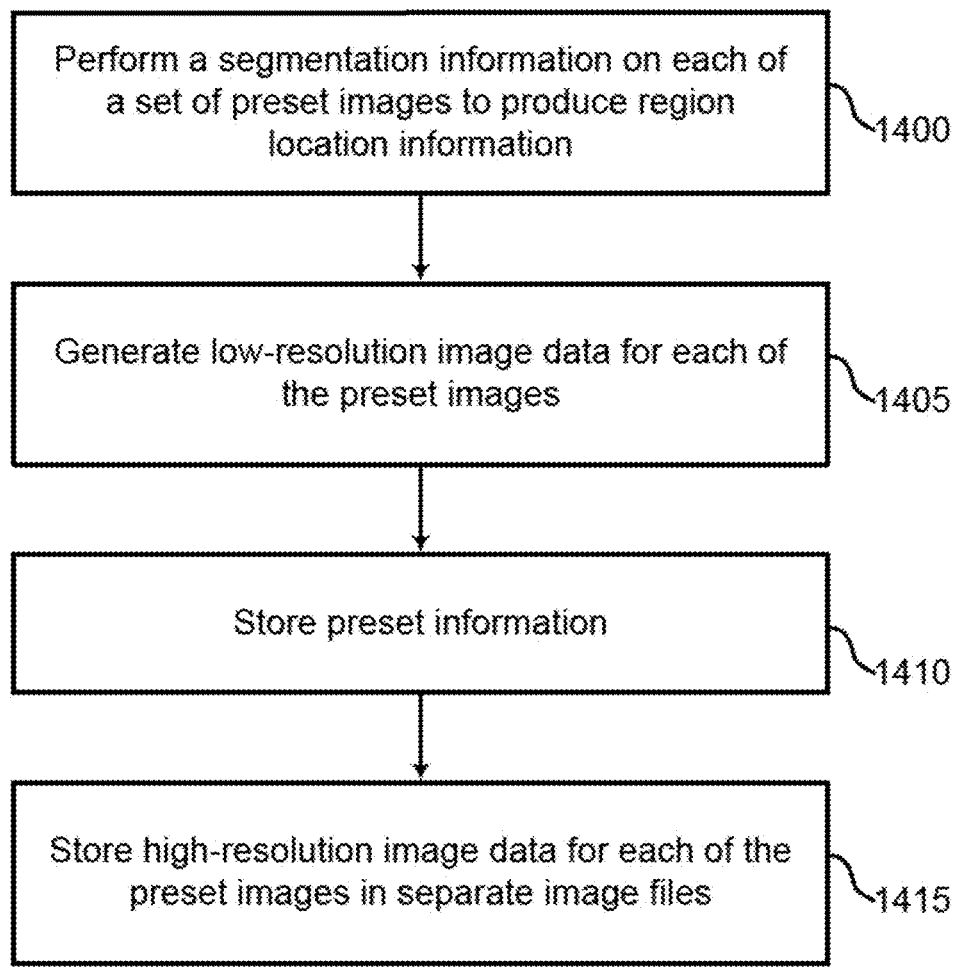

FIG. 14 shows an example of a process for image editing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1400, the system performs a segmentation information on each of a set of preset images to produce region location information. In some cases, the operations of this step refer to, or may be performed by, a segmentation network as described with reference to FIG. 4.

At operation 1405, the system generates low-resolution image data for each of the preset images. In some cases, the operations of this step refer to, or may be performed by, a thumbnail component as described with reference to FIG. 4.

At operation 1410, the system stores preset information including the region location information and the low-resolution image data for each of the set of preset images in a same presets information file. In some cases, the operations of this step refer to, or may be performed by, a database as described with reference to FIG. 1.

At operation 1415, the system stores high-resolution image data for each of the preset images in separate image files. In some cases, the operations of this step refer to, or may be performed by, a database as described with reference to FIG. 1.

Figure 15:
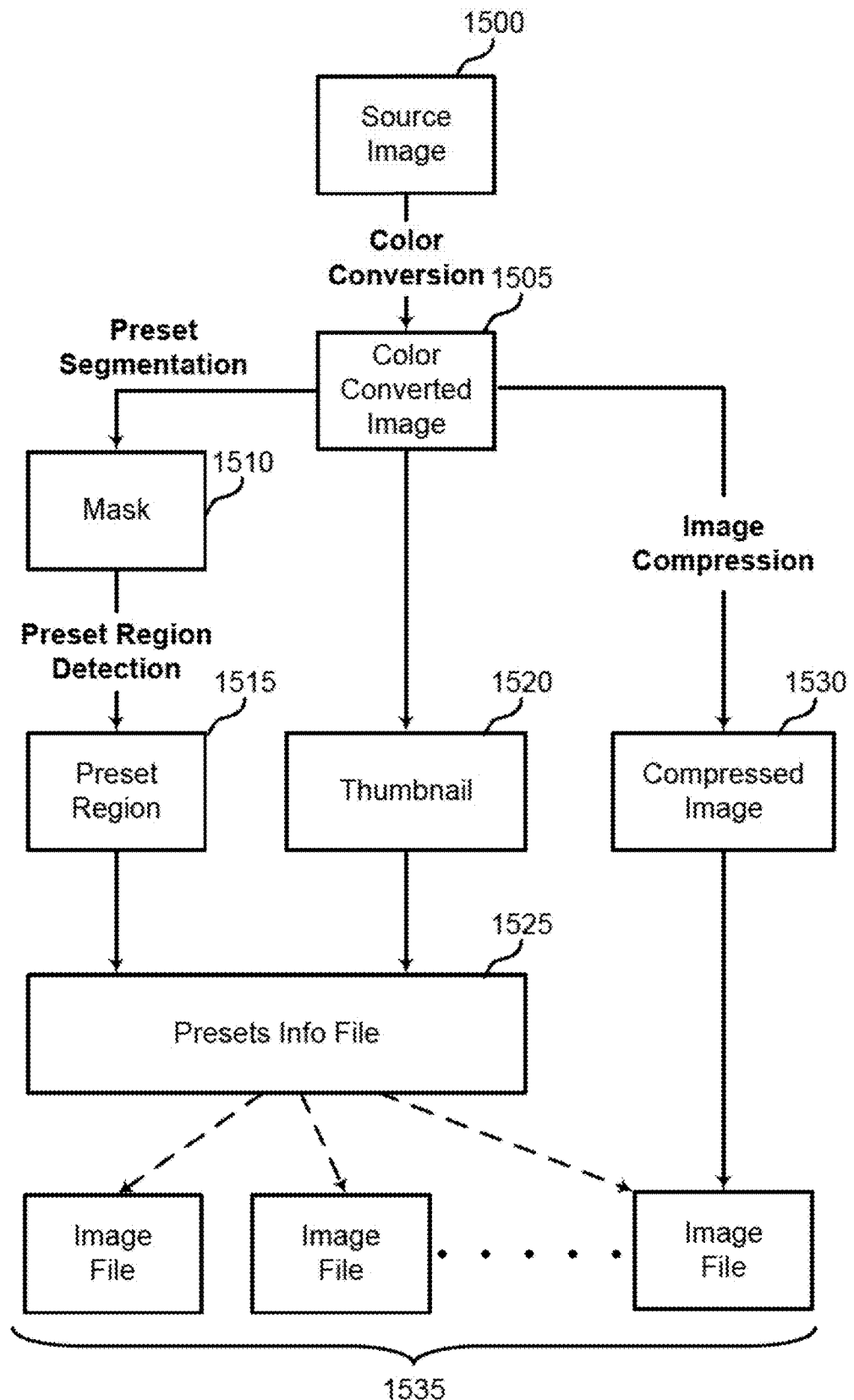
FIG. 15 shows an example of a preset creation diagram according to aspects of the present disclosure.

FIG. 15 shows an example of a preset creation diagram according to aspects of the present disclosure. The example shown includes source image 1500, color converted image 1535, mask 1510, preset region 1515, thumbnail 1520, presets info file 1525, compressed image 1530, and image files 1535.

The process of creating presets begins with the generation of a new unique ID saved as a preset ID in a presets info file. In some examples, the unique ID may include or be based on a universally unique ID (UUID). The source image 1500 is processed for color conversion using an RGB color space as the default target color profile. The metadata of the color converted image is saved in the presets info file 1525.

Additionally, or alternatively, the color converted image is segmented to create a mask. A region is detected in the mask using an algorithm (for example, an image region with 50-percent bound detection). The detected sky region represented by a bounding box in a source image 1500 and a thumbnail image created from a color converted image are saved in the presets info file 1525.

The high-resolution data of the color profile converted image is compressed and saved into an image file 1535, such as a JPEG or PNG file. In some examples, the source image 1500 is copied into an image file 1535 in the presets folder if the format is JPEG or PNG and the image mode is the same as the default target image mode. In some embodiments, the saved image file 1535 is named using the preset ID with a suffix (i.e., .jpg or .png). Other image file 1535 are high-resolution image files of presently used presets.

In some examples, the system receives a subsequent user selection. For example, the user may select a different image preset from a user interface. Then, the system releases the high-resolution data of the previously selected source image 1500, loads the high-resolution data of the selected source file as a new replacement image, converts the new replacement image color profile to the target color profile, detects a sky region from the color converted data, and then calculates sky replacement for a preview using the color converted data of the new replacement image and its detected sky region.

Thus, embodiments of the present disclosure pre-compute the image regions and associate the region information with the preset parameters, which may be loaded with other preset info when an image replacement interface is opened. For the user's new custom preset image, the image region may be computed when the new custom preset image is initially imported, and then the region information may be associated with the new preset. Thus, less computation is performed when the preset is used in the future.

In some cases when loading the presets, only the thumbnail data of the presets are loaded for preview. The high-resolution data of a preset may not be loaded into the memory until it is selected by the user for image replacement. When a new preset image is selected for image replacement, the high-resolution data of the previously selected preset image will be released from the memory. This preset loading approach provides efficiency of memory usage independent of the number of presets being previewed.

Figure 16:
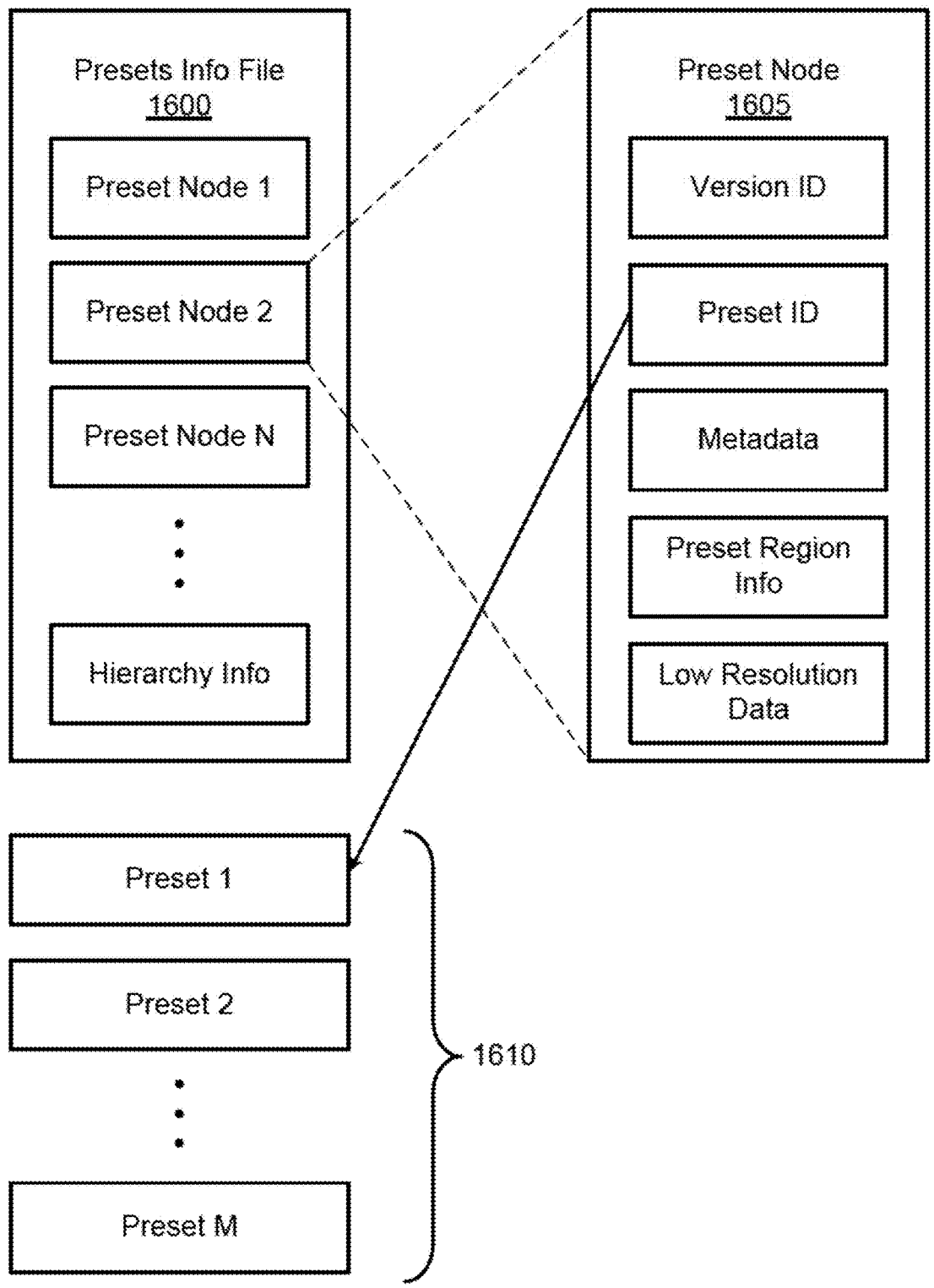
FIG. 16 shows an example of the preset representation structure according to aspects of the present disclosure.

FIG. 16 shows an example of the preset representation structure according to aspects of the present disclosure. The example shown includes presets info file 1600, preset node 1605, and preset identification 1610.

The basic structure of the preset representation comprises presets info file 1600 and one or more high-resolution image files stored in a default location. The presets info file 1600 contains preset node 1605 followed by hierarchy info for the presets and groups. The preset node 1605 is an instance of a preset containing a preset version ID, preset identification 1610, metadata, preset region info, and preset thumbnail data. The preset identification 1610, created as a unique ID, is unique and may be used to name the high-resolution image file (JPEG or PNG) of the associated unique preset. One or more preset node 1605 share a preset identification 1610 and the associated high-resolution image file. The metadata includes preset source type (for example, default or custom), image mode, image format, thumbnail image resolution, original image resolution, preset name, and color profile. For example, the sky region info is represented by a bounding box, pre-computed using the sky replacement segmentation pipeline when the preset is created.

In one example, the preset representation structure applies to preset images used for preloading information that includes a detected sky region of an image and loading the high-resolution version of the image based on the user selection.

When a user selects a new preset image, the sky regions in the preset image may be detected to find the coordinates for placing the new sky into the composition. In practice, the sky segmentation for a preset image could take significant computations. Therefore achieving the real-time sky replacement preview can be challenging. Furthermore, the user may preview the preset images before selecting. However, since the preset sky images typically have high resolutions, loading a large number of preset images can be slow and can use a significant amount of memory. Additionally or alternatively, saving preset image changes can also be slow if presets are represented in a single file.

To address these issues, the structure of the preset representation may be configured to contain a single presets info file 1600 and high-resolution image files. The presets info file 1600 contains a list of preset nodes and a hierarchy of information of the preset nodes and groups. Each preset node in the list contains information such as a version ID, a preset ID, metadata (such as image mode, format, size, color profile, etc.), pre-computed sky region information (e.g., a bounding box of the sky region), and thumbnail data.

The high-resolution image files contain the compressed image data of the preset images specified in the presets info file 1600. The base name of each image file is the associated preset ID of the preset specified in the presets info file 1600, and the suffix of each image file is the associated image format (e.g., .jpg or .png) of the preset specified in the presets info file 1600.

Preset images may be loaded by reading the presets info file 1600 and rendering the preset thumbnails to preview from the preset node 1605. Preset identification 1610 is then selected. For example, a preset thumbnail may be selected by the user (e.g., via the UI), and then the system automatically identifies which preset node is associated with the selected thumbnail.

The high-resolution image file name is determined using the preset ID and image format of a currently selected preset image. The high-resolution image file is read, and the high-resolution image data is converted to the target color profile. The preset image data is established for replacement with the pre-computed sky region info. Sky replacement is then calculated. The high-resolution image data of the current preset may be released from the memory when a different select is selected.

The source image file is read and the source image in converted to the default preset color profile to create a new custom preset. The sky region is detected in the source image, and a new unique preset ID is generated. The source image is then converted to the default preset image format (e.g., JPEG or PNG). The converted image file is saved to the presets folder, and is renamed with the new preset ID. A new preset node is created, and is added to the current preset node list.

Presets may then be saved by saving the updated preset nodes and hierarchy info to the presets info file 1600. High-resolution images may not be saved at this time since the high-resolution images have already been temporarily saved into separate files when creating new presets. Thus, the saving process becomes significantly fast by only updating the presets info file 1600.

The preset image representation provides increased sky replacement speed by using precomputed sky region info from the selected preset and increased presets loading speed for previewing. Additionally or alternatively, the preset image representation provides increased presets saving speed when there is any update of the presets to persist. Memory is used much more efficiently by loading the high-resolution image data of the preset upon selection and releasing the high-resolution image data upon deselection.

The workflow of loading presets comprises loading thumbnails and metadata of presets from the presets info file 1600. For example, loading presets comprises loading thumbnails, region info, and metadata from the presets info file 1600. The thumbnails are rendered in a preset view window. The hierarchy of presets and groups is read from the presets info file and shown in the preset view window. For example, when a preset is selected, the high-resolution image of the selected preset is loaded from an associated file (i.e., JPEG/PNG), and the image of the last selected preset is released. The high-resolution image data of the last selected preset (if any) is released from memory when a preset is selected for image replacement. The image file name is determined using the preset identification 1610 and image format of the presently selected preset in the preset node 1605. Image data of the selected preset is loaded, and the image is converted to a target color profile determined by the color profile (e.g., of the original image that contains the old sky). In some examples, the preset data is set for image replacement with pre-computed region info and other metadata and the image replacement is calculated for preview.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
receiving original image data;
locating a preset information file including preset information for each of a plurality of preset images, wherein the preset information for each of the plurality of preset images includes low-resolution image data and region location information for a corresponding preset image, wherein the region location information is generated based on the original image data;
retrieving the preset information from the preset information file;
generating at least one low-resolution preview image based on the original image data and the preset information;
selecting a preset image from among the plurality of preset images based on the at least one low-resolution preview image; and
loading high-resolution image data for the selected preset image.

2. The method of claim 1, further comprising:
replacing a target region of the original image data with a corresponding source region of the selected preset image.

3. The method of claim 2, wherein:
the target region is replaced based at least in part on the region location information.

4. The method of claim 1, wherein:
the at least one low-resolution preview image comprises at least one region of the corresponding preset image combined with at least one region of the original image data.

5. The method of claim 1, wherein:
the region location information corresponds to a sky region.

6. The method of claim 1, further comprising:
displaying a plurality of low-resolution preview images including at least one low-resolution preview image; and receiving feedback indicating the preset image, wherein the preset image is selected based on the feedback.

7. The method of claim 1, further comprising:
performing a segmentation operation on the high-resolution image data to produce the region location information.

8. The method of claim 1, wherein:
the region location information comprises bounding box information.

9. The method of claim 1, further comprising:
performing color conversion on the high-resolution image data based on the original image data.

10. An apparatus comprising:
a processor; and
a memory including instructions executable by the processor, the processor being configured to execute the instructions to:
receive original image data;
locate a preset information file including preset information for each of a plurality of preset images, wherein the preset information for each of the plurality of preset images includes low-resolution image data and region location information for a corresponding preset image, wherein the region location information is generated based on the original image data;
retrieve the preset information from the preset information file;
generate at least one low-resolution preview image based on the original image data and the preset information;
select a preset image from among the plurality of preset images based on the at least one low-resolution preview image; and
load high-resolution image data for the selected preset image.

11. The apparatus of claim 10, the processor being further configured to execute the instructions to:

replace a target region of the original image data with a corresponding source region of the selected preset image.

12. The apparatus of claim 10, the processor being further configured to execute the instructions to:
   display a plurality of low-resolution preview images including the at least one low-resolution preview image; and
   receive feedback indicating the preset image, wherein the preset image is selected based on the feedback.

13. The apparatus of claim 10, the processor being further configured to execute the instructions to:
   perform a segmentation operation on the high-resolution image data to produce the region location information.

14. The apparatus of claim 10, wherein the region location information comprises bounding box information.

15. The apparatus of claim 10, the processor being further configured to execute the instructions to:
   perform color conversion on the high-resolution image data based on the original image data.

16. A non-transitory computer-readable medium storing code, the code comprising instructions executable by a processor to:
   receive original image data;
   locate a preset information file including preset information for each of a plurality of preset images, wherein the preset information for each of the plurality of preset images includes low-resolution image data and region location information for a corresponding preset image, wherein the region location information is generated based on the original image data;
   retrieve the preset information from the preset information file;
   generate at least one low-resolution preview image based on the original image data and the preset information;
   select a preset image from among the plurality of preset images based on the at least one low-resolution preview image; and
   load high-resolution image data for the selected preset image.

17. The non-transitory computer-readable medium of claim 16, the code further comprising instructions executable by the processor to:
   replace a target region of the original image data with a corresponding source region of the selected preset image.

18. The non-transitory computer-readable medium of claim 16, the code further comprising instructions executable by the processor to: execute the instructions to:
   display a plurality of low-resolution preview images including the at least one low-resolution preview image; and receive feedback indicating the preset image, wherein the preset image is selected based on the feedback.

19. The non-transitory computer-readable medium of claim 16, the code further comprising instructions executable by the processor to:
   perform a segmentation operation on the high-resolution image data to produce the region location information.

* * * * *